(12) United States Patent
Gessner et al.

(10) Patent No.: US 12,527,862 B2
(45) Date of Patent: Jan. 20, 2026

(54) BACTERICIDAL/PERMEABILITY INCREASING PROTEIN FOR USE IN A METHOD OF IMMUNIZATION, PREFERABLY AS AN ADJUVANT IN A METHOD OF VACCINATION

(71) Applicant: UNIVERSITÄT REGENSBURG, Regensburg (DE)

(72) Inventors: André Gessner, Regensburg (DE); Sigrid Bülow, Regensburg (DE)

(73) Assignee: UNIVERSITÄT REGENSBURG, Regensburg (DE)

( * ) Notice: Subject to any disclaimer, the term of this patent is extended or adjusted under 35 U.S.C. 154(b) by 1051 days.

(21) Appl. No.: 17/053,925

(22) PCT Filed: May 9, 2019

(86) PCT No.: PCT/EP2019/061989
§ 371 (c)(1),
(2) Date: Nov. 9, 2020

(87) PCT Pub. No.: WO2019/215305
PCT Pub. Date: Nov. 14, 2019

(65) Prior Publication Data
US 2021/0299252 A1    Sep. 30, 2021

(30) Foreign Application Priority Data
May 9, 2018 (EP) .................... 18171481

(51) Int. Cl.
| | |
|---|---|
| *A61K 39/39* | (2006.01) |
| *A61K 39/00* | (2006.01) |
| *A61K 39/015* | (2006.01) |
| *A61K 39/04* | (2006.01) |
| *A61K 39/21* | (2006.01) |
| *A61K 45/06* | (2006.01) |
| *A61P 37/04* | (2006.01) |
| *C07K 14/47* | (2006.01) |

(52) U.S. Cl.
CPC .......... *A61K 39/39* (2013.01); *A61K 39/0008* (2013.01); *A61K 39/001* (2013.01); *A61K 39/015* (2013.01); *A61K 39/04* (2013.01); *A61K 39/21* (2013.01); *A61K 45/06* (2013.01); *A61P 37/04* (2018.01); *A61K 2039/5154* (2013.01); *A61K 2039/55516* (2013.01); *A61K 2039/55544* (2013.01); *A61K 2039/55561* (2013.01); *A61K 2039/55572* (2013.01); *A61K 2039/57* (2013.01); *C07K 14/4742* (2013.01)

(58) Field of Classification Search
CPC .. A61K 39/39; A61K 39/0008; A61K 39/001; A61K 39/015; A61K 39/04; A61K 39/21; A61K 45/06; A61K 2039/5154; A61K 2039/55516; A61K 2039/55544; A61K 2039/55561; A61K 2039/55572; A61K 2039/57; A61P 37/04; Y02A 50/30; C07K 14/4742
See application file for complete search history.

(56) References Cited

U.S. PATENT DOCUMENTS 5,643,570 A  *  7/1997  Theofan ............. C07K 14/4742
                                                       424/134.1

FOREIGN PATENT DOCUMENTS

| WO | 9323434 A2 | 11/1993 |
|---|---|---|
| WO | 2006015532 A1 | 2/2006 |

OTHER PUBLICATIONS

Marra MN, Wilde CG, Griffith JE, Snable JL, Scott RW. Bactericidal/permeability-increasing protein has endotoxin-neutralizing activity. J Immunol. Jan. 15, 1990;144(2):662-6. PMID: 2295804. (Year: 1990).*

Ng'uni T, Chasara C, Ndhlovu ZM. Major Scientific Hurdles in HIV Vaccine Development: Historical Perspective and Future Directions. Front Immunol. Oct. 28, 2020;11:590780. doi: 10.3389/fimmu.2020.590780. PMID: 33193428; PMCID: PMC7655734. (Year: 2020).*

Theprungsirikul J, Skopelja-Gardner S, Rigby WFC. Killing three birds with one BPI: Bactericidal, opsonic, and anti-inflammatory functions. J Transl Autoimmun. May 28, 2021;4:100105. doi: 10.1016/j.jtauto.2021.100105. PMID: 34142075; PMCID: PMC8187252. (Year: 2021).*

Guinan E, Avigan DE, Soiffer RJ, Bunin NJ, Brennan LL, Bergelson I, Brightman S, Ozonoff A, Scannon PJ, Levy O. Pilot experience with opebacan/rBPI 21 in myeloablative hematopoietic cell transplantation. F1000Res. Dec. 21, 2015;4:1480. doi: 10.12688/f1000research.7558.1. (Year: 2015).*

Weeratna RD, Makinen SR, McCluskie MJ, Davis HL. TLR agonists as vaccine adjuvants: comparison of CpG ODN and Resiquimod (R-848). Vaccine. Nov. 1, 2005;23(45):5263-70. doi: 10.1016/j.vaccine.2005.06.024. Epub Jul. 18, 2005. PMID: 16081189. (Year: 2005).*

(Continued)

*Primary Examiner* — Janet L Andres
*Assistant Examiner* — Carol Ann Chase
(74) *Attorney, Agent, or Firm* — SALIWANCHIK, LLOYD & EISENSCHENK

(57) ABSTRACT

The present invention relates to bactericidal/permeability increasing protein (BPI) for use in a method of immunization of a patient, preferably as an adjuvant in a method of vaccination. The present invention also relates to a preparation comprising BPI for use in a method of immunization of a patient, and optionally an immunomodulatory agent. The present invention further relates to a process of producing a preparation including BPI for use in a method of immunization of a patient.

12 Claims, 15 Drawing Sheets
Specification includes a Sequence Listing.

(56) References Cited

OTHER PUBLICATIONS

Figdor CG, de Vries IJ, Lesterhuis WJ, Melief CJ. Dendritic cell immunotherapy: mapping the way. Nat Med. May 2004;10(5):475-80. doi: 10.1038/nm1039. PMID: 15122249. (Year: 2004).*
Dardalhon V, Korn T, Kuchroo VK, Anderson AC. Role of Th1 and Th17 cells in organ-specific autoimmunity. J Autoimmun. Nov. 2008;31(3):252-6. doi: 10.1016/j.jaut.2008.04.017. Epub May 27, 2008. PMID: 18502610; PMCID: PMC3178062. (Year: 2008).*
Pan HF, Li XP, Zheng SG, Ye DQ. Emerging role of interleukin-22 in autoimmune diseases. Cytokine Growth Factor Rev. Feb. 2013;24(1):51-7. doi: 10.1016/j.cytogfr.2012.07.002. Epub Aug. 18, 2012. PMID: 22906768; PMCID: PMC4003867. (Year: 2012).*
Arshad T, Mansur F, Palek R, Manzoor S, Liska V. A Double Edged Sword Role of Interleukin-22 in Wound Healing and Tissue Regeneration. Front Immunol. Sep. 17, 2020;11:2148. doi: 10.3389/fimmu.2020.02148. PMID: 33042126; PMCID: PMC7527413. (Year: 2020).*
LaRosa SP, Opal SM. Sepsis strategies in development. Clin Chest Med. Dec. 2008;29(4):735-47, x-xi. doi: 10.1016/j.ccm.2008.06.007. PMID: 18954707. (Year: 2008).*
Czajkowsky DM, Hu J, Shao Z, Pleass RJ. Fc-fusion proteins: new developments and future perspectives. EMBO Mol Med. Oct. 2012;4(10):1015-28. doi: 10.1002/emmm.201201379. Epub Jul. 26, 2012. PMID: 22837174; PMCID: PMC3491832. (Year: 2012).*
Bauer RJ, White ML, Wedel N, Nelson BJ, Friedmann N, Cohen A, Hustinx WN, Kung AH. A phase I safety and pharmacokinetic study of a recombinant amino terminal fragment of bactericidal/permeability-increasing protein in healthy male volunteers. Shock. Feb. 1996;5(2):91-6. (Year: 1996).*
Scanu A, Luisetto R, Oliviero F, Galuppini F, Lazzarin V, Pennelli G, Masiero S, Punzi L. Bactericidal/Permeability-Increasing Protein Downregulates the Inflammatory Response in In Vivo Models of Arthritis. Int J Mol Sci. Oct. 28, 2022;23(21):13066. doi: 10.3390/ijms232113066. PMID: 36361854. (Year: 2022).*
Schultz H. From infection to autoimmunity: a new model for induction of ANCA against the bactericidal/permeability increasing protein (BPI). Autoimmun Rev. Mar. 2007;6(4):223-7. doi: 10.1016/j.autrev.2006.08.005. Epub Sep. 5, 2006. PMID: 17317612. (Year: 2007).*
Chuang HC, Chen MH, Chen YM, Yang HY, Ciou YR, Hsueh CH, Tsai CY, Tan TH. BPI overexpression suppresses Treg differentiation and induces exosome-mediated inflammation in systemic lupus erythematosus. Theranostics. Oct. 25, 2021;11(20): 9953-9966. doi: 10.7150/thno.63743. PMID: 34815797. (Year: 2021).*
Schultz H, Hume J, Zhang DS, Gioannini TL, Weiss JP. A novel role for the bactericidal/permeability increasing protein in interactions of gram-negative bacterial outer membrane blebs with dendritic cells. J Immunol. Aug. 15, 2007;179(4):2477-84. doi: 10.4049/jimmunol.179.4.2477. PMID: 17675509. (Year: 2007).*
Sabado RL, Balan S, Bhardwaj N. Dendritic cell-based immunotherapy. Cell Res. Jan. 2017;27(1):74-95. doi: 10.1038/cr.2016.157. Epub Dec. 27, 2016. PMID: 28025976; PMCID: PMC5223236. (Year: 2017).*
Aichele, Diana. et al. "Expression and Antimicrobial Function of Bactericidal Permeability-Increasing Protein in Cystic Fibrosis Patients" Infection and Immunity, Aug. 2006, pp. 4708-4714, vol. 74, No. 8.
Battafarano, Richard J. et al. "Peptide derivatives of three distinct lipopolysaccharide binding proteins inhibit lipopolysaccharide-induced tumor necrosis factor-alpha secretion in vitro" Surgery, Aug. 1995, pp. 318-324, vol. 118, No. 2.
Bulow, Sigrid. et al. "Bactericidal/Permeability-Increasing Protein Is an Enhancer of Bacterial Lipoprotein Recognition" Frontiers in Immunology, Dec. 5, 2018, pp. 1-16, vol. 9, Article 2768.
Canny, Geraldine and Ofer Levy, "Bactericidal/permeability-increasing protein (BPI) and BPI homologs at mucosal sites" Trends in Immunology, Nov. 1, 2008, pp. 541-547, vol. 29, No. 11.
Eckert, Melanie. et al. "Endotoxin-Induced Expression of Murine Bactericidal Permeability/Increasing Protein Is Mediated Exclusively by Toll/IL-1 Receptor Domain-Containing Adaptor Inducing IFN-β-Dependent Pathways" The Journal of Immunology, Jan. 1, 2006, pp. 522-528, vol. 176, No. 1.
Elsbach, Peter, "The bactericidal/permeability-increasing protein (BPI) in antibacterial host defense" Journal of Leukocyte Biology, Jul. 1998, pp. 14-18, vol. 64, No. 1.
Levin, Michael. et al. "Recombinant bactericidal/permeability-increasing protein (rBPI21) as adjunctive treatment for children with severe meningococcal sepsis: a randomised trial" The Lancet, Sep. 16, 2000, pp. 961-967, vol. 356, No. 9234.
Pinkenburg, Olaf. et al. "The Human Antimicrobial Protein Bactericidal/Permeability-Increasing Protein (BPI) Inhibits the Infectivity of Influenza A Virus" Plos One, Jun. 6, 2016, pp. 1-18, vol. 11, No. 6.
Schultz, Hendrik. et al. "A Novel Role for the Bactericidal/Permeability Increasing Protein in Interactions of Gram-Negative Bacterial Outer Membrane Blebs with Dendritic Cells" The Journal of Immunology, Aug. 3, 2007, pp. 2477-2484, vol. 179, No. 4.
Skanta, Frantisek. et al. "LBP/BPI homologue in Eisenia andrei earthworms" Developmental and Comparative Immunology, Aug. 18, 2015, pp. 1-6, vol. 54, No. 1.
Wittmann, Irene et al. "Murine Bactericidal/Permeability-Increasing Protein Inhibits the Endotoxic Activity of Lipopolysaccharide and Gram-Negative Bacteria" The Journal of Immunology, May 19, 2008, pp. 7546-7552, vol. 180, No. 11.
Database WPI, Thomson Scientific, Feb. 16, 2006, XP002786116 & WO 2006/015532A1, Univ Capital Medical Sci.

* cited by examiner

BACTERICIDAL/PERMEABILITY INCREASING PROTEIN FOR USE IN A METHOD OF IMMUNIZATION, PREFERABLY AS AN ADJUVANT IN A METHOD OF VACCINATION

CROSS REFERENCE TO RELATED APPLICATIONS

This application is a National Stage Application of International Application Number PCT/EP2019/061989, filed May 9, 2019; which claims priority to European Application No. 18171481.7, filed May 9, 2018.

The Sequence Listing for this application is labeled "SeqList-03Nov20-ST25.txt", which was created on Nov. 3, 2020 and is 9 KB. The entire content is incorporated herein by reference in its entirety.

FIELD OF THE INVENTION

The present invention relates to bactericidal/permeability-increasing protein (BPI) for use in a method of immunization of a patient, preferably as an adjuvant in a method of vaccination. The present invention also relates to a preparation comprising BPI for use in a method of immunization of a patient, and optionally an immunomodulatory agent. The present invention further relates to a process of producing a preparation including BPI for use in a method of immunization of a patient.

BACKGROUND OF THE INVENTION

A vaccination aims at stimulating an immune response to develop an adaptive immunity to an antigen. An antigen used alone for a vaccination usually does not sufficiently stimulate immune cells to produce high amounts of cytokines and other immune stimulatory molecules such as costimulatory cell surface molecules. Thus, application of only an antigen without further immunostimulatory agents in a vaccination often results in a low immune response. To stimulate cytokine production and to augment the immune response, adjuvants are additionally applied in a vaccination.

An immune response is a concerted action of the innate and the adaptive immune system. B cells and T cells play the major role in the acquisition of antigen-specific adaptive immunity, including an immunological memory, which is a main aim of a successful vaccination. Dendritic cells (DCs) are highly specialized antigen-presenting cells and have the ability to prime naïve CD4+ T cells to differentiate towards various specialized T helper cell lineages (Th cells) and CD8+ T cells to become fully active cytotoxic T cells. $Th_1$ cells are effector cells fighting intracellular pathogens and protozoa, whereas $Th_2$ cells are the host immunity effectors against extracellular parasites. $Th_{17}$ cells are involved in defense against extracellular bacteria and fungi. Differentiation towards different Th cell subset lineages, such as $Th_1$, $Th_2$, $Th_{17}$, or $Th_{22}$, occurs in a cytokine-dependent manner and cytokines are provided by DCs [1]. For example, cytokine interleukin 12 (IL-12), a heterodimer consisting of the subunits IL-12p35 and IL-12p40, is a key regulator of $Th_1$ cell differentiation and expansion [2, 3]. Chemokines, such as $CXCL_9$, $CXCL_{10}$, $CXCL_{11}$ and MCP-1 are not only important for the attraction of immune cells, but can also boost $Th_1$ cell differentiation in vivo, as shown for $CXCL_{10}$ [4]. Furthermore, IL-2 promotes proliferation of different cell types such as Th cell subsets or lymphoid cells, e.g. $Th_1$ cells, regulatory T cells, cytotoxic T cells, NK cells, and NKT cells. Cell types such as $Th_1$ cells, cytotoxic T cells, NK, and NKT cells produce high amounts of INFγ upon activation, which is a cytokine critical for innate and adaptive immunity. IL-6 and IL-23 are important for the generation and maintenance of $Th_{17}$ cells, whereas IL-6 and TNFα are important for $Th_{22}$ differentiation. IL4 is of special interest for $Th_2$ differentiation. The type of response induced ($Th_1$, $Th_2$, or $Th_{17}$, as well as cytotoxic T cells) has a significant impact on the protective efficacy of a vaccine. Therefore, it is important to consider the type of T cell response induced by an adjuvant to be used in a method of immunization of a patient.

Clinically commonly used adjuvants have the disadvantages that preferably an immunologically unfavorable $Th_2$ response is induced or that they have toxic potential. For example, aluminum salts are traditionally used as an adjuvant for vaccines. However, aluminum salts were shown to induce a shift to $Th_2$ responses in humans and animals. A $Th_2$ response typically results in a humoral response against extracellular pathogens or soluble toxins. In contrast thereto, protection against invasive pathogens, such as intracellular bacteria, protozoa, and viruses, is dependent on a $Th_1$ as well as a cytotoxic T cell response. The insufficient potential of an aluminum salt to elicit $Th_1$-mediated immune responses is a major limitation of its use as adjuvant, particularly considering vaccines against intracellular infections. Another disadvantage of most adjuvants are side effects caused by stimulation of cells that do not present or inadequately present antigens. Therefore, adjuvants specific for antigen-presenting cells, preferably dendritic cells, are needed.

WO 2004/084937 discloses using a $Th_1$ immune response inducing adjuvant for enhancing immune responses. However, $Th_1$ adjuvants, such as TLR-ligands, induce a $Th_1$-phenotype, but have a toxic potential due to stimulation of not only antigen-presenting cells but other cell types. Thus, well-tolerated adjuvants that induce a $Th_1$ response are needed.

Several publications have disclosed the therapeutic use of BPI, wherein BPI is used as an active pharmaceutical ingredient itself. However, the use of BPI as an adjuvant in a method of immunization has not been described.

U.S. Pat. No. 6,132,775 discloses therapeutic use of biologically active BPI in the treatment of infections with Gram-negative bacteria, and also relates to co-treatment using other agents in combination with BPI, such as antibiotics, immune system cells or factors such as T cells or IL-2.

U.S. Pat. No. 5,639,727 relates to therapeutic uses of BPI protein products for the treatment of conditions related to Gram-negative bacterial infection and the conditions not directly associated with gram-negative bacterial infection, including neutralization of the anti-coagulant properties of heparin, inhibition of angiogenesis, tumor and endothelial cell proliferation and treatment of chronic inflammatory disease states such as arthritis.

Srivastava et al. [5] disclose interaction of Gram-positive pneumococcus and $rBPI_{21}$, and potentiation of the inflammatory and apoptotic responses to pneumococci.

Levin et al. [6] discloses administration of BPI as adjunctive treatment for children with severe meningococcal sepsis.

In summary, there is a current urge to develop $Th_1$, $Th_{17}$, and cytotoxic T cell-eliciting adjuvants, which are important for vaccines against, for example, HIV, hepatitis, flu, malaria, *Mycobacterium tuberculosis*, allergies, and cancer.

The technical problem to be solved by the present invention was to provide an efficient adjuvant for use in a method of immunization of a patient.

SUMMARY OF THE INVENTION

In the following, the elements of the invention will be described. These elements are listed with specific embodiments, however, it should be understood that they may be combined in any manner and in any number to create additional embodiments. The variously described examples and preferred embodiments should not be construed to limit the present invention to only the explicitly described embodiments. This description should be understood to support and encompass embodiments which combine two or more of the explicitly described embodiments or which combine the one or more of the explicitly described embodiments with any number of the disclosed and/or preferred elements. Furthermore, any permutations and combinations of all described elements in this application should be considered disclosed by the description of the present application unless the context indicates otherwise.

In a first aspect, the present invention relates to bactericidal/permeability-increasing protein (BPI) for use in a method of immunization of a patient.

In one embodiment, in said method, said BPI is used as an adjuvant in a vaccine.

In one embodiment, in said method, BPI stimulates immune cells, wherein said immune cells are preferably antigen-presenting cells.

In one embodiment, said immune cells, preferably antigen-presenting cells, are selected from dendritic cells, macrophages, neutrophils, and monocytes, and wherein said antigen-presenting cells are preferably BPI high-responsive cells such as dendritic cells.

In one embodiment, said BPI is coadministered with an immunomodulatory agent, wherein, preferably, said immunomodulatory agent is selected from the group consisting of BPI-ligands, other adjuvants, check-point inhibitors, and other immunomodulatory agents of natural or (semi-) synthetic origin, such as TLR ligands, CLR ligands, CD1 ligands, inflammasome activators, alarmines and other pathogen-associated or danger-associated molecular patterns, lipoarabinomannans, phosphatidyl inositol mannosides, lipomannans, phospholipids (e.g. phosphatidylcholine), compounds containing a diacyl-thioglycerol motif (e.g. bacterial lipopeptides or-proteins), immunostimulatory agents displaying an acyl-anchor, antibodies, cytokines, chemokines, nucleic acids, nucleic acid analogs, and derivatives of any of the foregoing.

In one embodiment, said immunomodulatory agent is an immunostimulatory agent, wherein, preferably, said immunostimulatory agent is a TLR ligand, such as a bacterial lipopeptide (bLP) or—protein, a lipoteichoic acid or a CpG ODN, or is a CLR ligand, such as a lipoarabinomannan, or another immunostimulatory agent, e.g. a nucleic acid, a nucleic acid analog, or an immunostimulatory agent displaying an acyl-anchor.

In one embodiment, said BPI is coadministered with an antigen.

In one embodiment, said antigen is covalently coupled to BPI and/or to a BPI-ligand and/or to a carrier, or wherein said antigen is coadministered with said BPI, but not covalently coupled therewith, using a joint pharmaceutically acceptable delivery system for said antigen and said BPI, or wherein said antigen is coadministered with said BPI, but not covalently coupled therewith, using a separate pharmaceutically acceptable delivery system for each of said antigen and said BPI.

In one embodiment, said BPI is administered as a BPI-encoding nucleic acid within a vector, and wherein a nucleic acid sequence of said antigen is encoded by the same vector as said nucleic acid sequence of BPI and/or a BPI-ligand, or wherein a nucleic acid sequence of said antigen and said nucleic acid sequence of said BPI are each encoded by a separate vector, or wherein BPI is administered as a peptide and said antigen is administered being encoded by a vector, or wherein BPI is administered being encoded by a vector and said antigen is administered as a peptide.

In one embodiment, said BPI is administered as a BPI-encoding nucleic acid within a vector or said BPI is administered as a peptide, and said antigen is administered being a lipid, a carbohydrate, an inorganic molecule, a hapten, or any combination thereof.

In one embodiment, in said method, said BPI is administered to said immune cells in vitro, ex vivo or in vivo, thus resulting in stimulated immune cells, wherein said immune cells are preferably antigen-presenting cells, wherein said antigen-presenting cells are preferably dendritic cells.

In one embodiment, in said method, BPI is administered to said immune cells in vitro or ex vivo, and said in vitro or ex vivo stimulated immune cells, or supernatants thereof, are subsequently administered to said patient in vivo, wherein said in vitro or ex vivo stimulated immune cells, preferably dendritic cells, or supernatants thereof, are subsequently applied to said patient, and/or wherein said in vitro or ex vivo stimulated immune cells, preferably dendritic cells, or supernatants thereof, trigger generation of specific T cells, preferably selected from Th1 cells, Th17 cells, Th22 cells, other Th subsets, regulatory T cells, γδ T cells, cytotoxic T cells, or generation of innate lymphoid cells, NK cells, and NKT cells, and wherein said specific T cells and/or other lymphoid cells are subsequently applied to said patient.

In one embodiment, said immunization is a preventive or a therapeutic immunization.

In one embodiment, said preventive or therapeutic immunization is used for prevention or therapy of a disease selected from infectious diseases, for example caused by intracellular agents, such as viruses (e.g. HIV), intracellular bacteria (e.g. *Mycobacterium tuberculosis*) and intracellular parasites (e.g. *Plasmodium falciparum*), cancerous diseases, autoimmune diseases, neurodegenerative diseases, allergies, medical conditions after transplantations, including graft rejection and graft-versus-host disease (GvHD), chronic inflammatory diseases, other inflammatory conditions; and/or is used to alter the microbiome of a patient.

In a further aspect, the present invention also relates to a preparation for use in a method of immunization of a patient, said preparation comprising BPI and optionally an immunomodulatory agent selected from the group consisting of BPI-ligands, other adjuvants, check-point inhibitors, and other immunomodulatory agents of natural or (semi-) synthetic origin, such as TLR ligands, CLR ligands, CD1 ligands, inflammasome activators, alarmines and other pathogen-associated or danger-associated molecular patterns, lipoarabinomannans, phosphatidyl inositol mannosides, lipomannans, phospholipids (e.g. phosphatidylcholine), compounds containing a diacyl-thioglycerol motif (e.g. bacterial lipopeptides or lipoproteins), immunostimulatory agents displaying an acyl-anchor, antibodies, cytokines, chemokines, nucleic acids, and derivatives thereof, wherein said BPI, said method of immunization of a patient, and said immunomodulatory agent are as defined above.

In one embodiment, said preparation is a vaccine.

In this aspect, said BPI, said method of immunization, said patient, and said immunomodulatory agent are as defined above.

In a further aspect, the present invention also relates to a process for producing a preparation comprising BPI, said preparation being as defined above, wherein said process comprises the steps:
i) Providing, in any order, BPI, at least one excipient, and optionally an antigen.
ii) Mixing said BPI, said at least one excipient, and optionally said antigen, to provide a preparation comprising BPI for use in a method of immunization of a patient.

In one embodiment, said process for producing a preparation comprises providing an immunomodulatory agent for coadministration with BPI as an adjuvant.

In one embodiment, said preparation is a vaccine.

In this aspect, said preparation, said method of immunization, said patient, said BPI, said antigen, said immunomodulatory agent, said coadministration, said vaccine are as defined above.

In a further aspect, the present invention also relates to a method of immunization of a patient, comprising administering to a patient in need of such immunization an effective amount of BPI.

In one embodiment, said method of immunization is a prophylactic or therapeutic immunization.

In one embodiment, said prophylactic or therapeutic immunization is used for the prevention or therapy of a disease selected from infectious diseases, for example caused by intracellular agents, such as viruses (e.g. HIV), intracellular bacteria (e.g. *Mycobacterium tuberculosis*) and intracellular parasites (e.g. *Plasmodium falciparum*), cancerous diseases, autoimmune diseases, neurodegenerative diseases, allergies, medical conditions after transplantations, including graft rejection and graft-versus-host disease (GvHD), chronic inflammatory diseases, other inflammatory conditions; and/or is used to alter the microbiome.

In one embodiment, said patient is a human or an animal.

In one embodiment, said administering comprises intravenous, oral, nasal, mucosal, intrabronchial, intrapulmonary, intradermal, subcutaneous, intramuscular, intravascular, intrathecal, intraocular, intraarticular, intranodal, intratumoral, or intrametastatical administration or administration by another suitable route of said BPI.

In one embodiment, said method of immunization comprises administering to a patient in need of such immunization an effective amount of BPI, wherein BPI is coadministered with an immunomodulatory agent other than an antigen.

In this aspect, said method of immunization, said administering, said vaccine, said BPI, said immunomodulatory agent are as defined above.

In a further aspect, the present invention also relates to the use of BPI in the manufacture of a preparation for a preventive or therapeutic immunization.

In this aspect, said preparation, said BPI, said immunization are as defined above.

In a further aspect, the present invention also relates to BPI for use to immunomodulate target cells in vitro.

In one embodiment, said BPI is administered to a cell culture of target cells.

In one embodiment, said target cells comprise dendritic cells, other antigen-presenting cells, other immune cells, and/or body cells, and/or a combination of cells.

In one embodiment, said target cells are immune cells including lymphoid cells and T cells.

In one embodiment, said immune cells are antigen-presenting cells.

In one embodiment, said antigen-presenting cells are preferably dendritic cells.

In one embodiment, said antigen-presenting cells are preferably cells highly responsive to stimulation with BPI, such as dendritic cells.

In one embodiment, said BPI stimulates said target cells and alters the gene expression and protein production of said target cells.

In one embodiment, said BPI induces expression of protein encoding genes in said target cells, wherein the encoded proteins promote T cell activation (IL-2), and the differentiation of naïve T cells towards the Th1-lineage (IL-2, IL-12p70, CXCL10), the Th17-lineage (IL-6), the Th22-lineage (IL-6 and TNFa), and cytotoxic T cells (IL-2).

In one embodiment, said in vitro BPI-stimulated target cells are subsequently administered to a patient in vivo for modulation of the immune response of said patient.

In this aspect, said BPI, said administered, said immune cells, said patient are as defined above.

Without wishing to be bound by any theory, the present inventors have found that BPI unexpectedly activates immune cells to produce pro-inflammatory cytokines and chemokines of special importance to the activation of lymphoid cells such as T helper cells (e.g. Th1, Th17 cells) and CD8+ T cells. In detail, BPI unexpectedly enhances the immune response in antigen-presenting cells such as dendritic cells to produce cytokines and chemokines such as IL-2, IL-12, and CXCL10, thereby inducing differentiation of naïve T cells towards a Th1 phenotype, and to produce cytokines such as IL-6 and IL-23, thereby inducing differentiation towards a Th17 phenotype, and to produce cytokines such as IL-6 and TNFα, thereby inducing differentiation towards a Th22 phenotype, and to produce cytokines such as IL-2, thereby inducing differentiation of cytotoxic T cells. Thus, according to the present invention, BPI is useful in a method of immunization of a patient, for example, firstly, as an adjuvant in a vaccine for direct administration to a patient or, secondly, as a stimulant of target cells in vitro, which become in vitro-stimulated cells, wherein said in vitro-stimulated cells are subsequently administered to said patient. In order to solve the above technical problem, the present invention provides BPI for use in a method of immunization. Importantly, BPI preferentially activates subtypes of antigen-presenting cells such as dendritic cells and subtypes thereof, which are highly responsive to stimulation with BPI. In contrast thereto, other cell types such as macrophages and subtypes thereof, and lymph node cells, unexpectedly show no or a minor response to stimulation with BPI. Due to said preferential activation of certain subtypes of antigen-presenting cells, a reduction of side effects using BPI is expected compared to using other immunostimulatory substances and/or other adjuvants. The present inventors have found that BPI unexpectedly preferentially stimulates immune cells, particularly dendritic cells. Preferential stimulation of dendritic cells is of special interest for applications in which highly efficient antigen-presentation is of special importance, e.g. when a substance is used as an adjuvant in a vaccine. Therefore, preferential stimulation of dendritic cells is a predictor for a highly efficient adjuvant. In one embodiment, preferential stimulation of dendritic cells increases effectiveness, increases safety, and decreases reactogenicity and therefore side effects of a vaccination. In one embodiment, preferential stimulation of dendritic cells as seen for BPI is not a common characteristic of adjuvants other than BPI and is therefore a special characteristic of BPI, (as identified by the present inventors). Furthermore, the present inventors have found that BPI unexpectedly stimulates immune cells, particularly dendritic cells, to produce IL-2, which is a central cytokine for induction of lymphoid cells, such as Th cells and CD8+ T cells. In one embodiment, in particular, the potent induction of IL-2 in dendritic cells by BPI is not a common characteristic of adjuvants other than BPI and is therefore a characteristic of BPI. They also found that BPI also induces other cytokines and chemokines, such as IL-6, IL-12, IL-23 and CXCL10, which induce T cells, particularly Th1 and CD8+ cells, and Th17 cells. In one embodiment, the BPI mediated stimulation of Th1 and CD8+ responses allows to target intracellular agents, such as viruses, intracellular bacteria and intracellular parasites, and cancer cells by using BPI as an adjuvant in a vaccination. In another embodiment, the thus mediated stimulation of Th17 cells allows to target extracellular bacteria and fungi by using BPI as an adjuvant in a vaccination. In another embodiment, the thus mediated stimulation allows to shift the immune response towards Th1, Th17, and CD8+ cells by using BPI as an adjuvant in a vaccination to prevent, inhibit or reduce a Th2 response which is particularly useful in the treatment of allergies. Moreover, the present inventors have found that, unexpectedly, the immunostimulatory effect of BPI is synergistically enhanced in combination with an immunomodulatory agent, such as a TLR ligand, a CLR ligand, an agent displaying an acyl-anchor, and/or an agent in the form of a nucleic acid or a nucleic acid analog whereby said ligands and agents are examples of other adjuvants used in a vaccination. In another embodiment, BPI synergizes with other adjuvants and immunomodulatory agents to quantitatively and qualitatively increase and broaden the immune response in a vaccination. In one embodiment, the induction of Th1, Th17, CD8+ cells and other lymphoid cells by BPI can be modified by using a suitable combination partner.

In one embodiment, BPI alone or in combination with a suitable combination partner can also modulate antigen-presenting and other body cells to induce deactivation, tolerance, reduction or abortion of immune response of T cells and other immune cells.

The present inventors have detected that BPI acts synergistically with respect to the immunostimulatory effect in combination with immunomodulatory agents, such as TLR ligands, for example a bLP, a CpG ODN, R848, and Poly (I:C), bacterial lipopeptides, lipoproteins, lipoteichoic acids, and/or CLR ligands, for example lipoarabinomannans (e.g. ManLAM), and/or another immunostimulatory agent displaying an acyl-anchor, and/or another immunostimulatory agent being a nucleic acid or a nucleic acid analog. The present inventors disclose that BPI can activate different target cells to unexpectedly produce specific cytokines and chemokines, such as high amounts of IL-2 and others, which promote differentiation of lymphoid cells, such as Th1 cells, Th17 cells, Th22 cells, regulatory T cells, cytotoxic T cells, or activation of innate lymphoid cells, γδ T cells, NK, and NKT cells. BPI is thus identified as an excellent activator of lymphoid cells. Furthermore, the present inventors disclose that, unexpectedly, BPI preferentially stimulates dendritic cells. Since BPI is endogenously expressed, it is expected to exhibit an excellent tolerability.

BPI for use in a method of immunization, alone or in combination with a suitable combination partner, unexpectedly promotes cytokines that stimulate differentiation of Th1 cells, Th17 cells, Th22 cells, and cytotoxic T cells, and has thus the advantage of inducing Th1, Th17, Th22 cells, and cytotoxic T cell responses. The present invention aims at using this immunostimulatory effect of BPI for stimulating target cells, such as antigen-presenting cells including dendritic cells, in vitro, ex vivo, or in vivo, and using said immunostimulatory effect in a method of immunization of a patient, such as for the treatment and/or prevention of a disease selected from infectious diseases, tumors, autoimmune diseases, neurodegenerative diseases, allergies, medical conditions after transplantations, including graft rejection and graft-versus-host disease (GvHD), chronic inflammatory diseases, and/or to alter the microbiome of a human or an animal.

BPI for use in a method of immunization of a patient according to the present invention relates to BPI for use in a method of immunization of a patient, preferably as an adjuvant in a vaccine or as a stimulant of target cells in vitro, wherein said stimulated target cells are subsequently administered in vivo. The present invention also relates to ex vivo stimulation of target cells, wherein said target cells are directly stimulated with BPI or indirectly stimulated with BPI, such as T cells, and administering said directly or indirectly stimulated cells to a patient. The immunostimulatory effect of BPI can be modulated by coadministration of suitable combination partners.

DETAILED DESCRIPTION

The present inventors disclose that BPI has an immunostimulatory effect which can be used in a method of immunization of a patient. Administration of BPI to bone marrow derived dendritic cells induced a unique expression of specific genes and secretion of proteins relevant for stimulation of lymphoid cells, such as Th1 cells, Th17 cells, Th22 cells, regulatory T cells, cytotoxic T cells, innate lymphoid cells, γδ T cells, NK cells, and NKT cells. The molecules induced or modulated by administration of BPI, including cytokines, chemokines, and other gene products, such as cell surface molecules and receptors, have a high potential to affect immune cells, such as naïve T cells, and consequently the immune response to endogenous and exogenous antigens. BPI is thus a useful immunomodulator and can be used in a method of immunization of a patient, such as in a vaccination as an adjuvant in a vaccine.

This immunostimulatory effect can be modulated using suitable combination partners, and can be increased or directed at a certain favorable effect, depending on the suitable combination partner used. For example, the stimulatory effect of BPI can be synergistically enhanced and modified using TLR-ligands, such as the identified bacterial lipopeptides of the present invention. As another example, the immunostimulatory effect of BPI can be synergistically enhanced and modified using an immunomodulatory agent, such as a TLR agonist, for example CpG ODNs (e.g. ODN 1826, ODN 2006, ODN 2216, ODN 1585, ODN 1018), R848, and/or a CLR agonist, such as ManLAM, to synergistically induce the expression of IL-6 and/or IL12-p70 in a target cell such as a dendritic cell. In one embodiment, an induction of Th1, Th17 and CD8+ cells by BPI can be modified by using a suitable combination partner. The present inventors disclose a synergy of BPI with TLR, CLR and cytokine receptor-dependent or other immune receptor-dependent signaling, such as NLRP, STING, RIG-I or AIM2-dependent signaling. In one embodiment, coadministration of a TLR ligand, a CLR ligand, an adjuvant other than BPI, a NLRP activator, and/or a cytokine with BPI results in a synergistic effect. Coadministration of an antigen, for example by coupling an antigen to BPI or a BPI-ligand, aims at modulation of the cytokine pattern, and at enhanced uptake and presentation of the antigen by dendritic cells and other cells, and thus an enhanced specific immune response. Particularly, the present inventors have found that BPI, optionally in combination with an immunomodulatory agent and/or an antigen, surprisingly induces Th1, Th17, and CD8+ cells. BPI can thus be applied alone or in combination with a suitable combination partner and/or an antigen in a method of immunization of a patient, wherein BPI can be in vivo-administered directly to the patient, wherein BPI stimulates cells in vivo, for example BPI used as an adjuvant in a vaccine, or wherein BPI can be administered to an in vitro cell culture using cells of a patient or a donor and said in vitro-stimulated,-activated, or-modulated cells can be subsequently administered to a patient to induce or enhance or modulate an immune response in said patient.

BPI is herein disclosed to be a potent immunostimulator, and to be useful in a method of immunization of a patient, such as BPI acting as an adjuvant for a prophylactic or therapeutic immunization. A prophylactic or therapeutic immunization can be applied to prevent or treat infectious diseases, for example caused by intracellular agents, such as viruses (e.g. HIV), intracellular bacteria (e.g. *Mycobacterium tuberculosis*) and intracellular parasites (e.g. *Plasmodium falciparum*), cancerous diseases, such as benign tumors or malignant tumors, autoimmune diseases, allergies, medical conditions after transplantations, chronic inflammatory diseases, other inflammatory conditions, and/or to alter the microbiome of a patient. A prophylactic or therapeutic immunization according to the present invention can also be applied to disrupt immunological tolerance.

BPI can also be used to regulate the activation profile of DCs or other immune cells depending on interaction partners, such as immunomodulatory agents, to deactivate, attenuate, or disrupt the immune response of T cells or other immune cells or to induce tolerance in T cells and other immune cells. A prophylactic or therapeutic immunization can be applied to prevent or treat neurodegenerative diseases, autoimmune diseases, allergies, transplant rejections, or graft-versus-host disease (GvHD) after stem cell or bone marrow transplantations, or other inflammatory conditions, or to alter the microbiome.

BPI enhances secretion of Th1 cell-, Th17 cell-, Th22 cell-, Tfh cell-, regulatory T cell-, cytotoxic T cell-, innate lymphoid cell-, γδ T cell-, NK cell-, and NKT cell-promoting proteins in DCs. Furthermore, BPI has a high potential to indirectly determine towards which cell subtype naïve CD4+ and CD8+ T cells differentiate. Furthermore, costimulation of BPI with bLPs, such as (R)-Pam CSK4, augments the expression of T cell activating proteins, as well as Th1 cell-, Th17 cell-, Th22 cell-, regulatory T cell-, cytotoxic T cell-, innate lymphoid cell-, yo T cell-, NK cell- and NKT cell-promoting proteins, in a synergistic manner. In one embodiment, IL-6 and/or IL-12 induce follicular B helper T cells (Tfh cells). In one embodiment, BPI, alone or in combination with a suitable combination partner, induces IL-6 and IL-12, and therefore Tfh cells to induce antibodies directed against coadministered antigens or other antigens. In one embodiment, said antibodies neutralize antigens of viruses, bacteria, parasites and antigens of other origin. In one embodiment, said antibodies are neutralizing antibodies including broadly neutralizing antibodies. In one embodiment, said antibodies induce antibody-dependent cellular cytotoxicity (ADCC).

The term "bactericidal/permeability-increasing protein" or "BPI", as used herein, relates to and includes recombinant, (semi-) synthetic, and natural proteins, biologically active polypeptides and polypeptide fragments, such as rBPI21 (a N-terminal fragment of BPI modified in a single amino acid) or rBPI23 (a N-terminal fragment of BPI), and/or truncated forms having a bactericidal/permeability increasing function and/or a function as set forth in any of the foregoing paragraphs, as well as variants and analogs derived thereof. The term also relates to nucleic acids encoding said protein, said polypeptides, said polypeptide fragments, said truncated forms having a bactericidal/permeability increasing function and/or a function as set forth in any of the foregoing paragraphs, as well as variants, truncated forms, and analogs derived thereof. As used herein, in some embodiments, the terms "protein" and "peptide" are used interchangeably. Exemplary amino acid sequences of human and murine BPI are represented by SEQ ID no. 1 and 2, respectively, including polypeptides and polypeptide fragments and truncated forms and other variants thereof retaining at least one of its biological functions. BPI is a highly expressed protein in neutrophil granulocytes and belongs to the tubular-lipid binding protein (TULIP) family. According to literature, one of its main functions is the neutralization of the endotoxic activity of bacterial lipopolysaccharides (LPS). Due to its highly affine interaction with lipopolysaccharide, it is bactericidal for Gram-negative bacteria. Furthermore, BPI triggers opsonization of bacteria by immune cells. Since it exhibits a bactericidal activity against Gram-negative bacteria, blocks LPS-mediated inflammation, and opsonizes bacteria, BPI plays an important role in the innate immune response and therewith in the first line defense in fighting infections. The term "BPI", as used herein, can also refer to modified BPI, wherein BPI has been stabilized by modification, such as of protease cleavage sites, or wherein BPI has other modifications, such as altered glycosylation, as long as such modified form retains a bactericidal/permeability increasing function and/or a biological function of BPI as set forth in any of the foregoing paragraphs. Alternatively, BPI can relate to the genetic sequences of biologically active BPI, and biologically active polypeptide and polypeptide fragments, such as rBPI21 (a N-terminal fragment of BPI modified in single amino acids) or rBPI23 (a N-terminal fragment of BPI), and/or truncated forms, variants, and analogs thereof, having a bactericidal/permeability increasing function and/or a function as set forth in any of the foregoing paragraphs, which can be applied using a vector or a different delivery system. BPI, as used herein, may relate to human BPI, or structurally or functionally similar BPI of animals, plants, or other organisms. BPI for use in a method of immunization of a patient according to the present invention is a potent stimulant of immune cells, such as antigen-presenting cells, preferably dendritic cells, and can be administered in vitro, ex vivo, or in vivo. In one embodiment, BPI is or is not coadministered with a BPI-ligand and/or an antigen. In one embodiment, BPI preferentially stimulates antigen-presenting cells, wherein said antigen-presenting cells are preferably dendritic cells. In one embodiment, BPI is not part of a fusion protein. In one particular embodiment, BPI is not part of a fusion protein with an antibody fragment Fc. In one embodiment, BPI is not expressed in an AAV vector-based system. In another embodiment, BPI is part of a fusion protein. BPI is part of a fusion protein with an antigen. In yet another embodiment, BPI is part of a fusion protein with another protein which is not an antigen. In one embodiment, BPI is used as an adjuvant to boost an immune response to an antigen in a vaccine, thereby the vaccine evokes a production of more, optimized, and/or broader antibodies and a production of more, optimized, and/or broader cell mediated immunity, such as a T cell response and a longer-lasting immunity in a patient, thus minimizing the dose of antigen needed for a vaccination, compared to a vaccine without an adjuvant such as BPI. In one embodiment, BPI enhances the adaptive immune response to an antigen. In one embodiment, said boost of an immune response to a vaccine by BPI is enhanced in combination with a suitable combination partner. In one embodiment, BPI in combination with a suitable combination partner enhances the adaptive immune response to an antigen synergistically. In one embodiment, synergy of BPI with one or more suitable combination partners increases effectiveness and enables dose reduction to reduce side effects or decrease costs of a vaccination. In one embodiment, synergy of BPI with one or more suitable combination partners increases effectiveness in special populations, such as newborns, older adults, and/or immunocompromised patients. In one embodiment, BPI is not used for its direct antimicrobial and/or direct antibacterial and/or direct bactericidal and/or direct antibiotic activity. In one embodiment, BPI is used as an adjuvant in a vaccine containing a BPI-ligand, a BPI-interaction partner, an other combination partner or a suitable combination partner or a combination thereof.

The term "suitable combination partners", as used herein, relates to BPI-ligands, BPI-interaction partners, and to other combination partners. In one embodiment, a suitable combination partner relates to an immunomodulatory agent, preferably to an immunostimulatory agent.

The term "BPI-ligands", as used herein, relates to known and yet unknown natural or (semi-) synthetic BPI-ligands that increase, decrease, stabilize, destabilize, or otherwise modulate the effect of BPI, or do not modulate the effect of BPI. BPI-ligands are, for example, lipopolysaccharides, bacterial lipopeptides, and -proteins, compounds containing a diacyl-thioglycerol motif (e.g. bacterial lipopeptides or-proteins), lipoteichoic acids, subunits of lipoteichoic acids (e.g. monoglucosyldiacylglycerol and diglucosyldiacylglycerol), phosphatidyl inositol mannoside, lipomannans, lipoarabinomannans and subunits thereof, other immunostimulatory agents displaying an acyl-anchor, phospholipids (e.g. phosphatidylcholine), and derivatives, precursors, analoga and other variants of any of the foregoing. BPI-ligands also include a nucleic acid, such as a CpG ODN, a DNA, a dsDNA, a mitochondrial DNA, a RNA, a purine metabolite and ATP, and nucleic acid analoga, such as Poly(I:C), PIKA, imiquimod and R848. Another BPI-ligand is the TLR4 ligand lipopolysaccharide, analoga and/or derivates thereof, such as MPL or RC-529. In one embodiment, BPI-ligands are selected from CD1 ligands, inflammasome activators or DAMPs. In one embodiment, phosphatidylcholine and phosphatidylglycerol are examples for CD1 ligands. In one embodiment, ATP or dsDNA are examples for inflammasome activators.

In one embodiment, DNA, mitochondrial DNA, RNA, purine metabolites and ATP are examples for DAMPs.

The term "BPI-interaction partners", as used herein, relates to any molecule, including BPI-ligands, that increases, decreases, stabilizes, destabilizes, or otherwise modulates the effect of BPI, and possibly interacts with BPI via covalent bonds or non-covalent bonds, and/or to any molecule interacting with BPI.

The term "other combination partners", as used herein, refers to adjuvants other than BPI, such as alum, and to other immunomodulatory substances of natural or (semi-) synthetic origin, such as TLR-ligands, CLR-ligands, CD1 ligands, inflammasome activators, cytokines, chemokines, nucleic acids, growth factors, interferons, antibodies, alarmins and other pathogen-associated or danger-associated molecular patterns (PAMPs and DAMPs, respectively), as well as derivatives, precursors, and other variants thereof. Also comprised are carriers and carrier substances for BPI, BPI-ligands, and other BPI-interaction partners, including agents that stabilize BPI, BPI-ligands, and other BPI-interaction partners, and/or control the release thereof. In one embodiment, other combination partners are PAMPs, DAMPs and alarmins as they induce upregulation of TLRs and CLRs on target cells to increase synergy between BPI and BPI ligands and/or between BPI and BPI interaction partners.

The term "bacterial lipopeptides (bLPs)" or "bacterial lipoproteins", as used herein, relates to a family of proinflammatory cell wall components found in both Gram-positive and Gram-negative bacteria, mycobacteria, fungi, and other microbes. The stimulatory activity of bLPs resides in their acylated amino terminus. The term refers to recombinant, (semi-) synthetic, and natural lipopeptides or-proteins, and comprises, for example, bacterial triacylated lipopeptides, such as (R)-Pam$_3$CSK$_4$, or bacterial diacylated lipopeptides, such as (R)-Pam$_2$CSK$_4$, and (R)-FSL-1. As used herein, in some embodiments, the terms "protein" and "peptide" may be used interchangeably.

The term "(R)-Pam$_3$CSK$_4$", as used herein, refers to a synthetic tripalmitoylated lipopeptide that mimics the acylated amino terminus of bacterial lipoproteins. Recognition of (R)-Pam3CSK4 is mediated by the TLR2/TLR1 heterodimer and induces NF-κB-related downstream signaling.

The term "lipoteichoic acids", as used herein, refers to a component of the cell wall of Gram-positive bacteria which is anchored to the cell membrane via an acyl-anchor. Examples of lipoteichoic acids (LTAs), as used herein, are LTA preparations of S. pneumoniae D39Acps (LTA SP), and of Lgt-deficient mutants (LTA SPΔlgt).

The term "lipoarabinomannan", as used herein, relates to a glycolipid that is a virulence factor of Mycobacteria, containing an acyl-anchor.

The term "Poly(I:C)", as used herein, relates to polyinosinic: polycytidylic acid which is an immunostimulant. Poly (I:C) is known to interact with toll-like receptor 3 (TLR3), which is expressed in the membrane of B-cells, macrophages and dendritic cells. Poly(I:C) is a synthetic analog of and structurally similar to double-stranded RNA.

The term "R848", as used herein, relates to Resiquimod which is a drug that acts as an immune response modifier. R848 is an agonist for toll-like receptor 7 and 8. R848 is a purine analog resembling single-stranded RNA.

The term "CpG oligonucleotide" or "CpG oligodeoxynucleotide" or "CpG ODN", as used herein, relates to short single-stranded synthetic DNA molecules that contain a CpG motif, which is a cytosine triphosphate deoxynucleotide followed by a guanine triphosphate deoxynucleotide. CpG ODNs act as immunostimulant and are recognized by TLR9. In one embodiment, ODN 1826, ODN 2006, ODN 2216, ODN 1585 or ODN 1018 are examples of CpG ODNs.

The term "nucleic acid or nucleic acid analog", as used herein, relates to an immunomodulatory agent that synergistically enhances the immunostimulatory effect of BPI, such as a immunostimulatory DNA or a immunostimulatory RNA and analoga thereof (e.g. CpG ODN, R848 or Poly(I:C)). In one embodiment, "nucleic acid or nucleic acid analog", as used herein, can also relate to a DNA, a RNA and analoga thereof that modulate the function of BPI. In one embodiment, a "nucleic acid or nucleic acid analog" is a TLR ligand and optionally a CLR ligand. In one embodiment, immunostimulatory DNAs or immunostimulatory RNAs are a component of viruses, bacteria, archaea, fungi, protozoa and mitochondria. In one embodiment, immunstimulatory DNA sequences are present in viruses, bacteria, archaea, fungi, protozoa, mitochondria, plant cells, animal cells and human cells. In one embodiment, immunostimulatory DNAs or immunostimulatory RNAs are of natural or (semi-) synthetic origin or a combination of both.

The term "acyl-anchor" as used herein, refers to an acylglycerol motif containing at least one fatty acid, wherein the acylglycerol motif is covalently coupled to a molecule. In one embodiment, an acyl-anchor enables the integration of said molecule into a phospholipid membrane. In one embodiment, an acyl-anchor anchors a molecule in a phospholipid membrane. In one embodiment, an acyl-anchor is comprised in molecules, such as bacterial lipopeptides/-proteins, lipoteichoic acids or lipoarabinomannans. In one embodiment, an acyl-anchor is part of a glycosylphosphatidylinositol-anchor (GPI-anchor). In one embodiment, an acyl-anchor is diacyl-glycerol based. In one embodiment, an acyl-anchor refers to a compound containing a diacyl-thioglycerol motif, wherein the acylglycerol is modified by a cysteine, such as in di- or triacylated bacterial lipopeptides or-proteins. In one embodiment, the acyl-anchor interacts with BPI.

The term "compounds containing a diacyl-thioglycerol motif", as used herein, relates to compounds containing a glycerol-core modified by two fatty acids and cysteine, such as di- or triacylated bacterial lipopeptides or-proteins.

The term "antigen", as used herein, relates to a molecule capable of inducing an immune response either alone or after forming a complex with a larger molecule, and that can be recognized by receptors of the immune system, such as antibodies or T cell receptors. Antigens derive from living or dead cells, cell lysates, tissue lysates, replication-competent or replication-defective viruses, virus particles, proteins, peptides, DNA, RNA, lipids, carbohydrates, inorganic molecules, or any combination thereof. An antigen used in the present invention may originate from an inorganic source. An antigen used in the present invention may derive from, for example, bacteria, archaea, viruses, prions, fungi, parasites, inorganic sources, plants, animals, or humans. An antigen according to the present invention may also be a tumor antigen and/or a molecule expressed by a cancer cell. An antigen according to the present may be an exogenous or an endogenous antigen. Mixtures of different antigens are also possibly used according to the present invention. According to the present invention, BPI may be applied with or without an antigen. Antigens can be applied covalently coupled to BPI, covalently coupled to known or unknown BPI-ligands, covalently coupled to other BPI-interaction partners, covalently coupled to a carrier or carrier substance, or can be coadministered with BPI, wherein the antigen is not covalently coupled to BPI or any BPI-interaction partner. An antigen according to the present invention can also be applied in form of its nucleic acid sequence, wherein a nucleic acid sequence of an antigen can be applied using a vector encoding BPI and/or an immunomodulatory agent, or using a separate vector encoding only the antigen. An antigen can be applied using a vector or a different delivery system. In one embodiment, BPI is administered as a peptide or protein, and an antigen is administered as nucleic acid sequence, such as encoded on a vector. In one embodiment, BPI is administered as nucleic acid sequence, such as encoded on a vector, and an antigen is administered as a peptide or protein. In one embodiment, coupling of an antigen to BPI or a BPI ligand or other BPI-interaction partners increases the antigen-uptake and antigen-presentation by antigen-presenting cells, and particularly stimulates Th1, Th17, Tfh, and CD8+ cells. In one embodiment, as used herein, the terms "peptide" and "protein" are used interchangeably.

The term "administration", as used herein, relates to various routes of administration, for example, firstly, to in vivo administration, wherein BPI is directly administered to a patient to modulate the immune response of said patient by stimulation of target cells of said patient in vivo, wherein said target cells are preferably immune cells, more preferably antigen-presenting cells, and even more preferably dendritic cells, secondly, to ex vivo administration, wherein BPI stimulates patient-derived target cells in cell culture and said ex vivo-stimulated target cells are subsequently administered to said patient to modulate the immune response of said patient, thirdly, to in vitro administration, wherein BPI is administered to target cells derived from a donor or from a commercially available source, or to a combination thereof, wherein said in vitro-stimulated cells are preferably subsequently administered to a patient, or fourthly, to a combinatory administration, wherein BPI is combinatorially administered using two or more routes selected from in vivo, ex vivo, and in vitro administration. In one embodiment, said combinatory administration is a combination of in vitro-stimulated target cells and BPI that are coadministered to a patient. In another embodiment, said combinatory administration is a combination of ex vivo-stimulated target cells and BPI that are coadministered to a patient. In vivo-, ex vivo- and in vitro-administration of BPI can be combined with coadministration of suitable combination partners. In one embodiment, in vitro-stimulated cells, ex vivo-stimulated cells, and/or in vivo-stimulated cells are directly or indirectly stimulated cells, for example directly or indirectly stimulated target cells. In one embodiment, directly stimulated cells are cells directly stimulated with BPI. In one embodiment, indirectly stimulated cells are cells stimulated with directly stimulated cells or with supernatants of directly stimulated cells, and are thus indirectly stimulated with BPI using BPI-stimulated cells or supernatants of directly stimulated cells. In one embodiment, said directly stimulated cells are immune cells, such as dendritic cells, which stimulate lymphoid cells and/or T cells. In one embodiment, indirectly stimulated cells are lymphoid cells and/or T cells. In one embodiment, directly and/or indirectly stimulated cells are administered in vivo after stimulation in vitro and/or ex vivo.

The term "coadministration", as used herein, refers to combined administration of BPI with other substances, such as a suitable combination partner, and/or an antigen, and/or target cells stimulated with BPI in vitro, and/or target cells stimulated with BPI ex vivo. In one embodiment, a coadministration of BPI and at least one other substance is carried out simultaneously or consecutively. In one embodiment, BPI is coadministered with both an immunomodulatory agent and an antigen. In one embodiment, BPI is coadministered with both an antigen and/or immunomodulatory agent and/or another suitable combination partner, and said coadministration is performed in vivo and/or in vitro and/or ex vivo.

The term "in vitro administration", as used herein, refers to incubation of target cells with BPI in cell culture, optionally with additional application of T cells and/or other immune cells, optionally with additional application of suitable combination partners, and/or antigen, and optionally subsequent in vivo administration of the obtained cells or of subpopulations thereof. In one embodiment, said target cells are preferably immune cells, wherein said immune cells are preferably antigen-presenting cells, wherein said antigen-presenting cells are preferably dendritic cells. In one embodiment, said in vitro administration of BPI stimulates said antigen-presenting cells, preferably dendritic cells, in vitro, thus resulting in stimulated antigen-presenting cells, preferably stimulated dendritic cells. In one embodiment, said stimulated antigen-presenting cells may be subsequently applied to a patient in vivo. In one embodiment, said stimulated antigen-presenting cells trigger generation of specific T cells selected from lymphoid cells, such as Th1 cells, Th17 cells, Th22 cells, Tfh cells, other Th cell subsets, regulatory T cells, cytotoxic T cells, γδ T cells, innate lymphoid cells, NK cells, and NKT cells. In one embodiment, said generated specific T cells selected from Th1 cells, Th17 cells, Th22 cells, Tfh cells, other Th subsets, regulatory T cells, cytotoxic T cells, γδ T cells, innate lymphoid cells, NK cells, and NKT cells may be subsequently applied to a patient in vivo. The term "in vitro" administration is equivalent to "ex vivo" administration, if patient-derived cells are used. In one embodiment, BPI is administered to a cell culture of target cells in vitro, optionally in combination with an antigen and/or an immunomodulatory agent, such as a TLR ligand, a CLR ligand, an agent displaying an acyl-anchor, and/or an agent in the form of a nucleic acid or a nucleic acid analog. In one embodiment, BPI is administered to a cell culture of target cells in vitro, optionally in combination with a suitable combination partner.

The term "ex vivo administration", as used herein, refers to incubation of target cells with BPI in cell culture in vitro, optionally with additional application of T cells, and/or other immune cells, and/or other body cells, optionally with additional application of suitable combination partners, and/or and antigen, and subsequent in vivo administration of BPI-incubated target cells or of subpopulations thereof to a patient, wherein said target cells, said T cells, said other immune cells, said other body cells derived from said patient. In one embodiment, BPI is administered to a cell culture of target cells ex vivo, optionally in combination with an antigen and/or an immunomodulatory agent, such as a TLR ligand, a CLR ligand, an agent displaying an acyl-anchor, and/or an agent in the form of a nucleic acid or a nucleic acid analog. In one embodiment, BPI is administered to a cell culture of target cells ex vivo, optionally in combination with a suitable combination partner.

The term "in vivo administration", as used herein, refers to administration of BPI and/or BPI-stimulated cells to a human or an animal. In vivo administration of BPI as an immunomodulatory agent, such as an adjuvant, and/or BPI-simulated cells may be performed intravenously, orally, nasally, mucosally, intrabronchially, intrapulmonarily, intradermally, subcutaneously, intramuscularly, intravascularly, intrathecally, intraocularly, intraarticular, intranodally, intratumorally, or intrametastatically, or by another suitable route. In one embodiment, BPI is administered to patient in vivo, optionally in combination with an antigen and/or an immunomodulatory agent, such as a TLR ligand, a CLR ligand, an agent displaying an acyl-anchor, and/or an agent in the form of a nucleic acid or a nucleic acid analog. In one embodiment, BPI and/or BPI-stimulated cells are administered to a human or animal, optionally in combination with a suitable combination partner.

The term "effective amount", as used herein, relates to an amount of BPI for use and/or the preparation for use of the present invention, said amount having an immunostimulatory effect on a target cell and/or a patient. In one embodiment, an effective amount is an amount of BPI and/or the preparation of the present invention that enhances the immune response in an antigen-presenting cell such as a dendritic cell to produce cytokines and chemokines such as IL-2, IL-12p70, and CXCL10, thereby capable of inducing differentiation of a naïve T cell towards a Th1 phenotype, and/or to produce cytokines such as IL-6 and IL-23, thereby capable of inducing differentiation towards a Th17 phenotype, and/or to produce cytokines such as IL-6 and TNFα, thereby capable of inducing differentiation towards a Th22 phenotype, and/or to produce cytokines such as IL-2, thereby capable of inducing differentiation of cytotoxic T cells, and/or to produce cytokines and chemokines to induce activation and differentiation of other lymphoid celltypes. In one embodiment, an effective amount of BPI in vivo is in the range of from 1 µg/kg/dose to 1 g/kg/dose, preferably 100 µg/kg/dose to 300 mg/kg/dose, more preferably 1 ng/kg/dose to 30 mg/kg/dose. In one embodiment, an effective amount of BPI in vitro is in the range of from 1 pM to 1 M, preferably 1 nM to 10 µM.

The term "target cell", as used herein, refers to dendritic cells, antigen-presenting cells other than dendritic cells, immune cells other than dendritic cells and antigen-presenting cells, and body cells. In particular, target cells are preferably immune cells, wherein immune cells are preferably antigen-presenting cells, wherein antigen-presenting cells are preferably dendritic cells, macrophages, neutrophils, and monocytes. Antigen-presenting immune cells connect the innate immune response with the adaptive immune response and play an important role in the initiation of immune responses. Dendritic cells are specialized antigen-presenting immune cells and are highly efficient in stimulating T- and B-lymphocytes to produce an immunological memory. Target cells may be autologous cells derived from a patient, or may be derived from a donor, such as allogeneic cells or syngeneic cells, or may be derived from a commercially available source. In one embodiment, immune cells are preferred target cells. In one embodiment, antigen-presenting cells selected from monocytes, macrophages, neutrophils, and dendritic cells, are preferred immune cells. In one embodiment, dendritic cells are preferred antigen-presenting cells. In one embodiment, dendritic cells are preferred target cells. In one embodiment, antigen-presenting cells and/or dendritic cells and/or other target cells can be stimulated in vivo, ex vivo or in vitro.

The term "immune cell", as used herein, relates to any of the cells involved in the immune system of an organism. These include any of the cells of the innate immune system and the adapted immune system, for example, cytotoxic T cells, T helper cells, regulatory T cells, γδ T cells, NKT cells, NK cells, B lymphocytes, innate lymphoid cells, macrophages, monocytes, neutrophils, dendritic cells, mast cells, eosinophils, and basophils.

The term "antigen-presenting cell", as used herein, relates to a cell that presents an antigen on its surface, for example, by means of a MHC class I molecule or a MHC class II molecule. Exemplary antigen-presenting cells are dendritic cells, macrophages, monocytes, neutrophils, and B cells. In one embodiment of the present invention, BPI stimulates an antigen-presenting cell to produce cytokines that promote T cell responses, such as Th1, Th17, Th22, Tfh, regulatory T cell and cytotoxic T cell responses. In one embodiment, an antigen-presenting cell is highly responsive to BPI ("BPI high-responsive cell") or is not highly responsive to BPI ("BPI low-responsive cell"). In one embodiment, a subtype of antigen-presenting cells is highly responsive to stimulation with BPI. In one embodiment, an antigen-presenting cell is preferably a BPI high-responsive cell, more preferably a dendritic cell.

The term "BPI high-responsive cell", as used herein, relates to a cell, such as a dendritic cell, which shows high responsiveness to stimulation with BPI resulting in increased expression and/or secretion of cytokines and chemokines, such as IL-2, IL-12p70, CXCL10, IL-6, or TNFα. In one embodiment, a BPI high-responsive cell is a cell that produces at least a 2-fold increase in TNFα in response to stimulation with BPI (100 nM) for 18 h compared to unstimulated cells as determined by ELISA (cf. example 4), or a cell that produces at least a 2-fold increase of TNFα and/or type I interferon and/or of at least one of the genes important for T cell priming and activation as well as for attraction of other immune cells in response to stimulation with BPI (200 nM) for 4 h compared to unstimulated cells as determined by microarray analysis (cf. example 2). The term "unstimulated cells", as used in this context, refers to cells that have not been stimulated with BPI or another immunostimulatory or immunomodulatory agent. In one embodiment, a BPI high-responsive cell is a subtype of antigen-presenting cells. In one embodiment, a BPI high-responsive cell, also related to as cell highly responsive to stimulation with BPI, is preferably a dendritic cell. In one embodiment, a BPI high-responsive cell derives from a subpopulation of dendritic cells. In one embodiment, a BPI high-responsive cell is defined by expression of CLRs (e.g. BDCA-2, Dectin-2, MCL, DCAR, DC-SIGN, DEC205, LOX-1, Langerin and mannose receptor MRC1) and/or scavenger receptors (e.g. CD36 or LOX-1) and/or TLRs (e.g. TLR1, TLR2, TLR3, TLR4, TLR5, TLR6, TLR7, TLR8, TLR9, TLR10, TLR11, TLR12, TLR13).

The term "dendritic cell (DC)", as used herein, are cells whose main function is to present antigens to T cells. Therefore, the term dendritic cell relates to a specialized antigen-presenting cell that is involved in initiating immune responses and/or in maintaining tolerance of the immune system to antigens. DCs prime T cells, such as naïve CD8+ and CD4+ T cells, which proliferate and become activated to exert their cytotoxic potential or differentiate towards various specialized T helper cell lineages, respectively. DCs also are capable of activating lymphoid cells other than T cells. In one embodiment, dendritic cells exhibit surface markers, such as CD1a and/or CD1c (BDCA1) and/or CD11b and/or CD11C and/or CD123 (IL-3Rα) and/or CD141 (BDCA3) and/or CD16 (FcγRIII) and/or CD172a (Sirp-α) and/or CD207 (Langerin) and/or CD303 (BDCA2/CLEC4C) and/or CD304 (Neuropilin-1/BDCA4) and/or CD324 (E-Cadherin) and/or CD326 (EpCAM) and/or CD366 (TIM-3) and/or CD370 (CLEC9A/DNGR1) and/or CD64 (FcγRI) and/or CD85g (ILT7) and/or CLEC6A (Dectin-2) and/or CX3CR1 and/or NECL2 (CADM1) and/or other DC-characteristic surface markers. In one embodiment, dendritic cells are selected from monocyte-derived dendritic cells and/or conventional dendritic cells and/or plasmacytoid dendritic cells and/or other cells exhibiting defined functions of dendritic cells and/or subtypes of any of the foregoing.

The term "immunomodulatory agent", as used herein, relates to any agent other than an antigen that modulates the immune response of an organism. It further relates to any agent that modulates characteristics, for example gene expression or protein secretion, of an immune cell. An immunomodulatory agent, as used herein, may have an immunomodulatory effect on the whole immune system and/or on dendritic cells, antigen-presenting cells other than dendritic cells, immune cells other than antigen-presenting cells, and body cells. In one embodiment, an immunomodulatory agent is an immunostimulatory agent. In one embodiment, an immunomodulatory agent is another adjuvant in a vaccination. In one embodiment, an immunomodulatory agent synergizes with BPI. In one embodiment, an immunomodulatory agent is not an antibiotic agent. An immunomodulatory agent, as used herein, may be selected from the group consisting of BPI-ligands, other adjuvants, checkpoint inhibitors, and other immunomodulatory agents of natural or synthetic origin, such as TLR ligands (e.g. bLPs, a CpG ODN, R848, Poly(I:C)), CLR ligands (e.g. ManLAM), CD1 ligands (e.g. phospholipids), inflammasome activators (e.g. a LTA or a LPS), alarmins and other pathogen-associated or danger-associated molecular patterns such as said TLR or CLR ligands, components and structures related to ManLAM, (e.g. lipoarabinomannans, phosphatidyl inositol mannosides, lipomannans), phospholipids (e.g. phosphatidylcholine), compounds containing a diacyl-thioglycerol motif (e.g. bacterial lipopeptides or-proteins), immunostimulatory agents displaying an acyl-anchor (e.g. bacterial lipopeptides or-proteins, a LTA and lipoarabonomannans such as ManLAM), antibodies, cytokines (e.g. Interleukin-6 to increase the expression of TLRs, CLRs and other immune receptors), chemokines, nucleic acids (e.g. a CpG ODN, analoga and/or derivatives thereof such as R848 or Poly(I:C)). In one embodiment, an immunomodulatory agent is not an Fc fragment of an antibody and/or is not an adeno-associated virus (AAV). An immunomodulatory agent can be applied covalently coupled to BPI, covalently coupled to other BPI-interaction partners, covalently coupled to a suitable combination partner, covalently coupled to a carrier or carrier substance, or can be coadministered with BPI, wherein the immunomodulatory agent is not covalently coupled to BPI or any BPI-interaction partner, using a vector or a different delivery system. In one embodiment, an immunomodulatory agent coadministered with BPI is preferably a TLR ligand or a CLR ligand. In one embodiment, an immunomodulatory agent comprises an acyl anchor and interacts with BPI via said anchor, or is in the form of a nucleic acid, such as CpG ODN or an immune stimulatory single and double stranded RNA, or is in the form of a nucleic acid analog, such as Poly(I:C), or is an agent that does not bind to BPI but has synergistic effects with BPI such as R848.

The term "immunomodulatory effect" or "immunomodulation", as used herein, relates to activation, inhibition, deactivation, expansion, deletion, tolerance-induction or tolerance-disruption, and other modulatory effects on dendritic cells, antigen-presenting cells other than dendritic cells, immune cells other than antigen-presenting cells, and body cells. The term further comprises an indirect downstream effect on T cells, other immune cells and body cells. Moreover, the term comprises an effect on the immune system of an organism. In one embodiment, said immunomodulatory effect is an immunostimulatory effect. In one embodiment, said immunomodulatory effect can be fine-tuned using suitable combination partners.

The term "immunostimulatory", as used herein, refers to the capacity to stimulate the immune system by inducing activation or increasing activity of any of its components, for example an immune cell. Immunostimulation may result, for example, in priming, differentiation, or expansion of T cells. Accordingly, the term "immunostimulatory agent", as used herein, refers to an immunomodulatory agent having the capacity to stimulate the immune system by inducing activation or increasing activity of any of its components. In many of the embodiments, BPI is an immunostimulatory agent stimulating antigen-presenting cells such as dendritic cells. In one embodiment, CpG oligonucleotide has a synergistic effect with BPI enhancing the immunostimulatory effect of BPI. In one embodiment, an immunostimulatory effect of BPI is a pro-inflammatory effect.

The term "stimulant", as used herein, refers to a means for stimulating a cell and/or an organism to increase mRNA synthesis and/or protein production and/or cell specific functions, such as degranulation, migration or endocytosis. For example, BPI for use in a method of immunization of a patient according to the present invention acts as a stimulant for immune cells and induces antigen-presenting cells, such as dendritic cells to produce cytokines that promote for example Th1, Th17, Th22 and cytotoxic T cell responses.

The term "adjuvant", as used herein, relates to an immunological agent that that exhibits an immunostimulatory or immunomodulatory effect when applied with an antigen and/or other molecule. An adjuvant is useful in an immunization of a patient, for example, an adjuvant can be added to a vaccine to augment the immune response to an applied antigen. Thereby, the efficacy of a vaccine is improved. Thus, an adjuvant is important for directing the adaptive immune system to the antigen of a vaccine. In one embodiment of the present invention, BPI is used as an adjuvant in a vaccine for use in a vaccination of a patient. In one embodiment of the present invention, BPI acts as adjuvant by stimulating antigen-presenting cells comprising dendritic cells to produce cytokines that promote lymphoid cell responses, such as Th1, Th17, Th22, Tfh, regulatory T cell and cytotoxic T cell immune responses. In one embodiment, BPI is an adjuvant that stimulates dendritic cells (DCs) in a method of immunization of a patient. In one embodiment, BPI is used as a DC-preferential adjuvant in a method of vaccination of a patient. In one embodiment, BPI is used as a DC-preferential adjuvant for direct administration in a vaccination of a patient, or for in vitro stimulation using donor cells and/or commercially available cells, such as DCs, and subsequent administration of said in vitro-stimulated cells, such as DCs, to a patient, or for in vitro stimulation of cells, such as DCs, to activate and/or induce proliferation in lymphoid cells derived from a patient, a donor, or a commercial source, such as specific T cells, in vitro, wherein said lymphoid cells, such as specific T cells, are subsequently administered to a patient. In one embodiment, said in vitro-stimulated DCs are patient-derived cells and said in vitro stimulation refers to an ex vivo stimulation of patient-derived cells. In one embodiment, sources of cells for ex vivo and in vitro stimulation are combined, for example lymphoid cells of a patient, and dendritic cells of a donor or of a commercially available source. In one embodiment, said BPI is used as an adjuvant in combination with TLR- and/or CLR-ligand based adjuvants and/or other adjuvants. In one embodiment, BPI can be used as an adjuvant to prime and/or to boost an adaptive immune response. Said priming relates to an initial vaccination of an individual with an antigen which is unknown to the individual's immune system. Said boosting relates to a vaccination of an individual with an antigen that is known to the individual's immune system due to a previous infection and/or a previous vaccination and/or another previous exposure. In one embodiment, an adjuvant can be applied to an attenuated and an inactivated vaccine.

The term "other adjuvant", as used herein, relates to an adjuvant other than BPI, such as commonly used adjuvants, including alum and alum salts, aluminum hydroxide, aluminum phosphate, calcium phosphate hydroxide, hydroxyphosphate sulfate, ligands such as TLR4 ligands absorbed to alum (e.g. ASO4 or RC-529), paraffin oil, inactivated *Bordetella pertussis*, inactivated *Mycobacterium bovis*, toxoid, squalene, Quil A, Freund's complete adjuvant, Freund's incomplete adjuvant, adjuvant 65, MF59, ASO3, MPL, derivates and synthetic analoga of lipopolysaccharide (e.g. monophosphoryl lipid A), QS21, ASO4, ASO1 including ASO1$_E$ and ASO1$_B$, ASO2, AFO3, IC31, RC-529, CpG oligonucleotide (e.g. ODN 1018), dsRNA, Imiquimod, Resiquimod, Poli (I:C), PIKA, ISCOMATRIX, EGVac system, GLA-SE, IC31, ISA51, VAX2012Q, VAX125, VCL-HB01, virosomes, which can be coadministered with BPI. In one embodiment, the adjuvant is of natural or (semi-)synthetic source. In one embodiment, the other adjuvant comprises any of the above mentioned adjuvants or components thereof, such as Polysorbate 80, sorbitan trioleate, squalen, DL-alpha-tocopherol, polyoxyethylene cetostearyl ether, mannitol, sorbitan oleate, MPL, saponins, quillaja saponins, QS-21, bacterial DNA, bacterial polysaccharide, lipids, cholesterol, cationic peptides, and/or flagellin, or a yet unknown adjuvant. In one embodiment, an "other adjuvant" includes TLR and CLR ligands. In one embodiment, adjuvants include delivery systems and carrier or carrier systems as defined.

The term "immunization", as used herein, relates to a means for making an organism, such as a human or an animal, immune to a particular immunogen, such as an antigen derived from a pathogen. For example, the adaptive immune system can get activated to neutralize and inactivate a particular immunogen. In many of the embodiments of present invention, the term "immunization", as used herein, relates to a vaccination. In one embodiment, said immunization is performed using a vaccine, wherein BPI acts as an adjuvant in said vaccine. In one embodiment, immunization refers to induction of immune memory of the innate immune system. In one embodiment, immunization refers to induction of immune memory of the adaptive immune system. In another embodiment of the present invention, said immunization is performed using patient-derived cells that were stimulated with BPI ex vivo. In another embodiment of the present invention, said immunization is performed using donor cells and/or commercially available cells that were stimulated with BPI in vitro. In one embodiment, sources of cells for ex vivo and in vitro stimulation are combined, for example lymphoid cells of a patient, and dendritic cells of a donor or of a commercially available source. In one embodiment, said immunization is a prophylactic or therapeutic immunization. In one embodiment, BPI is for use as an adjuvant in a method of immunization. In one embodiment, a method of immunization of a patient according to the present invention comprises either administering BPI as an adjuvant in a vaccine in a vaccination, or administering BPI-stimulated cells to induce or enhance the immune response in said patient, or both, wherein BPI-stimulated cells are cells directly stimulated with BPI or cells indirectly stimulated, wherein said indirectly stimulated cells are stimulated using directly stimulated cells. In one embodiment, said indirectly stimulated cells are stimulated in a co-culture with directly stimulated cells. In one embodiment, said indirectly stimulated cells are T cells. In one embodiment, said indirectly stimulated cells are lymphoid cells.

The term "prophylactic or therapeutic immunization" or "preventive or therapeutic immunization", as used herein, relates to application of a preparation, such as a vaccine, to a patient in need thereof to prevent or treat diseases such as infectious diseases for example caused by intracellular agents such as viruses (e.g. HIV), intracellular bacteria (e.g.

*Mycobacterium tuberculosis*) and intracellular parasites (e.g. *Plasmodium falciparum*), cancerous diseases, autoimmune diseases, neurodegenerative diseases, allergies, medical conditions after transplantations, including graft rejection and graft-versus-host disease (GvHD), chronic inflammatory diseases, other inflammatory conditions; and/or is used to alter the microbiome of a patient.

The term "vector", as used herein, refers to a vehicle for nucleic acids, including viral vectors, cosmids, artificial chromosomes, and plasmids, for example vector pCR3. A vector according to the present invention may relate to a DNA vector, a RNA vector, or a DNA/RNA hybrid vector, wherein each may be integrating or not integrating. Exemplary vectors according to the present invention are BPI-expression vectors, such as BPI-expressing viruses, plasmids, and BPI-expressing bacterial or cell constructs. In one embodiment, a vector comprises a CpG motif or a CpG ODN. In one embodiment, a vector does not relate to an adeno-associated viral vector AAV.

The term "delivery system", as used herein, relates to a pharmaceutically acceptable delivery system, optionally a sustained release system, for the delivery of protein, peptide or nucleic acid in vivo, ex vivo, or in vitro, for example, vectors, viruses, virus-like particles, liposomes including cationic liposomes, emulsions (e.g. such as oil-in-water emulsion or water-in-oil-in-water emulsions), millicapsules, microcapsules, nanocapsules, vesicles, micelles, virosomes, milliparticles, microparticles, nanoparticles, nanocomplexes, saponin complexes, millispheres, microspheres, nanospheres, microemulsions, nanoemulsions. In one embodiment, a delivery system is used to deliver any of BPI, an antigen, and an immunomodulatory agent. In one embodiment, BPI, and optionally any of an antigen and a BPI ligand, is coupled to a nanoparticle. In one embodiment, a BPI ligand is coupled to a nanoparticle, and BPI may bind to said BPI ligand on said nanoparticle, wherein optionally, an antigen is also coupled to said nanoparticle.

The term "carrier or carrier substance", as used herein, refers to pharmaceutically acceptable carrier of protein or nucleic acid or lipid, for example alum and alum salts, aluminum hydroxide, aluminum phosphate, calcium phosphate hydroxide, hydroxyphosphate sulfate, genetically modified cross-reacting material (CRM) of diphtheria toxin, tetanus toxoid (T), meningococcal outer membrane protein complex (OMPC), diphtheria toxoid (D), and *H. influenzae* protein D (HiD).

The term "alarmin", as used herein, refers to an endogenous molecule that is released upon tissue or cell damage and activates the immune system, for example α-defensin, cathelicidin, lactoferrin, high-mobility group box-1, or cationic peptides. Alarmins may activate DCs and establish immunostimulatory effects. The term alarmin can be used interchangeable with the term DAMP.

The term "checkpoint inhibitors", as used herein, relates to molecules that inhibit an immune checkpoint, such as antibodies against PD-L1, PD-1, and CTLA-4.

The term "TLR", as used herein, relates to toll-like receptors (TLRs) which are a class of pattern-recognition receptors that recognize structurally conserved molecules, for example, derived from microbial pathogens, referred to as pathogen-associated molecular patterns (PAMPs). TLRs are expressed on several types of immune cells, such as macrophages and dendritic cells, as well as other body cells.

The term "TLR ligands", as used herein, relates to ligands of toll-like receptors, for example, multiple diacyl and triacyl lipopeptides and lipoproteins, multiple glycolipids, lipoteichoic acid, lipopolysaccharide, bacterial flagellin, imidazoquinoline, single stranded RNA, double stranded RNA, and DNA of bacterial, viral, mitochondrial, (semi-) synthetic or other origin as well as analoga of said TLR ligands. In one embodiment, a TLR ligand is of natural or (semi-) synthetic origin. In one embodiment, a TLR ligand is a molecule that binds to any of TLR1, TLR2, TLR3, TLR4, TLR5, TLR6, TLR7, TLR8, TLR9, TLR10, TLR11, TLR12, and TLR13. In one embodiment, a TLR ligand is a molecule that binds to TLR1, TLR2, TLR3, TLR4, TLR5, TLR6, TLR7, TLR8, TLR9, TLR10, TLR11, TLR12, or TLR13.

The term "CLR", as used herein, relates to C-type lectin receptors, which are a class of soluble or transmembrane pattern recognition receptors that recognize pathogen-associated molecular patterns, including, but not limited to carbohydrates or molecules containing carbohydrates. CLR are typically expressed by dendritic cells, and are also expressed by other body cells.

The term "CLR ligands", as used herein, relates to ligands of the C-type lectin-like receptor family, including for example Curdlan, Zymosan, Zymosan Depleted, Furfurman, lipoarabinomannans, phosphatidyl inositol mannoside, phosphatic acid, cardiolipin, phosphatidylglycerol, CpG oligonucleotides, mono- and diglucosyldiacylglycerol which bind to C-type lectin receptors. In one embodiment, a component of LTAs such as monoglucosyldiacylglycerol or diglucosyldiacylglycerol, is a CLR ligand. In one embodiment, a CLR ligand is of natural or (semi-) synthetic origin or a combination of both. In one embodiment, a CLR ligand binds to a member of the Dectin-1 cluster such as Dectin-1 or LOX-1 and/or the Dectin-2 cluster such as Dectin-2, DCAR, Mincle or MCL and/or another CLR such as DC-SIGN and DEC205. In one embodiment, Dectin-2 and DC-SIGN are receptors for ManLAM, Mincle is a receptor for monoglucosyldiacylglycerol or diglucosyldiacylglycerol or other LTA subunits, and/or DCAR is a receptor for phosphatidyl-inositol mannoside or other ManLAM subunits and DEC205 is a receptor for CpG ODN. In one embodiment, said CLR ligands are ligands of BPI.

The term "CD1", as used herein, relates to CD1 (cluster of differentiation 1) molecules on the surface of antigen-presenting cells.

The term "CD1 ligands", as used herein, relates to ligands of CD1, including lipids such as phosphatidylcholine, phosphatidylglycerol, phosphatidylethanolamine, and derivates thereof.

The term "pathogen-associated or danger-associated molecular patterns", as used herein, relates to pathogen-associated molecular patterns (PAMPs) and danger-associated molecular patterns (DAMPs). PAMPs are conserved molecules derived from groups of pathogens that activate an innate immune response, such as TLR or CLR ligands derived from pathogens or analoga or derivate thereof such as bLPs, LTAs, ManLAM, a CpG ODN, Poly(I:C) or R848. DAMPs are endogenous molecules that, for example, are released by stressed cells undergoing necrosis acting as endogenous danger signals that initiate a noninfectious inflammatory response. Examples of DAMPs, including alarmins, are DNA, mitochondrial DNA, RNA, purine metabolites, ATP, S100, IL-1a, IL-6, IL-33, IL-16, high-mobility group box 1 (HMGB1), cathelicidin, cardiolipin, hyaluronic acid fragments.

The term "inflammasome activators", as used herein, relates to molecules that activate an inflammasome, for example NLRP3 inflammasome activators and AIM2 inflammasome activators, such as extracellular ATP, Alum salts, monosodium urate, dsDNA, bacterial pore-forming toxins.

The term "excipient", as used herein, refers to a pharmaceutically acceptable substance that is formulated alongside the active ingredients, such as BPI and optionally an antigen and/or an immunomodulatory agent, wherein the excipient has the purpose of enhancing the properties of the vaccine composition, such as long-term stabilization and/or enhancing solubility. For example, an excipient may be a preservative, emulsifier, solubilizer, buffer, or absorption accelerant.

The term "supernatant", as used herein, relates to a supernatant of cells stimulated with BPI. In one embodiment, a supernatant is prepared as follows: Target cells such as antigen-presenting cells such as dendritic cells are stimulated with BPI with or without a suitable combination partner such as a BPI ligand, e.g. by using cell culture medium and previously or simultaneously plating cells in a cell culture plate. Stimulation can be done simultaneously or at different time points, in different order, and multiple times. After variable incubation times the supernatant of the stimulated cells will be collected and proceeded e.g. by pooling, concentration, dilution, centrifugation, purification, precipitation, fractionation or filtration. The supernatant can either be used directly or after storage at temperatures between −210° C. and 40° C.

The term "fine-tuning" of an adjuvant or an immunomodulatory effect, as used herein, relates to a precise adjustment of the effect evoked by BPI as an adjuvant. The term comprises augmentation of an immunostimulatory effect, e.g. by means of a synergistic effect, and modulation of an immunostimulatory effect. Suitable combination partners can be used to fine-tune the immunostimulatory or immunomodulatory effect of BPI.

The term "microbiome", as used herein, relates to the whole collection of microorganisms present within a host, including commensal, symbiotic, and pathogenic microorganisms, such as bacteria, archaea, protozoa, fungi, viruses, and helminths. In one embodiment, the microbiome of a patient is altered by targeted vaccination against an unwanted, pathogenic microbe to decrease and/or eliminate said microbe from the microbiome of said patient by a BPI-enhanced specific vaccination strategy. In one embodiment, said altering of the microbiome relates to a BPI-enhanced vaccination against multiresistent bacteria, facultative pathogenic bacteria, or enterococci in GvHD.

BRIEF DESCRIPTION OF THE FIGURES

In the following, reference is made to the figures.

All methods mentioned in the figure descriptions below were carried out as described in detail in the examples.

A. Gene expression in murine DCs stimulated with murine and human BPI (microarray, 4h). A linear relation between huBPI and muBPI was observed indicating that no species barrier exists.

B. Examples of induced genes with importance for activation and priming of T cells and other lymphoid cells, such as IL-1b, IL-2, IL-6, IL-10, IL-12b, IL-15, CXCL10, TNFα, CD40 and CD86, and chemokines important for the attraction of immune cells, such as MCP-1, CXCL9, CXCL10 and CXCL11 (microarray, 4h). Importantly, IL-2 is the highest induced cytokine.

C. Example for gene induction by BPI as shown for IL-2, CXCL10, IL-12p40, and IL-6 in murine DCs using rtPCR.

Figure 3:
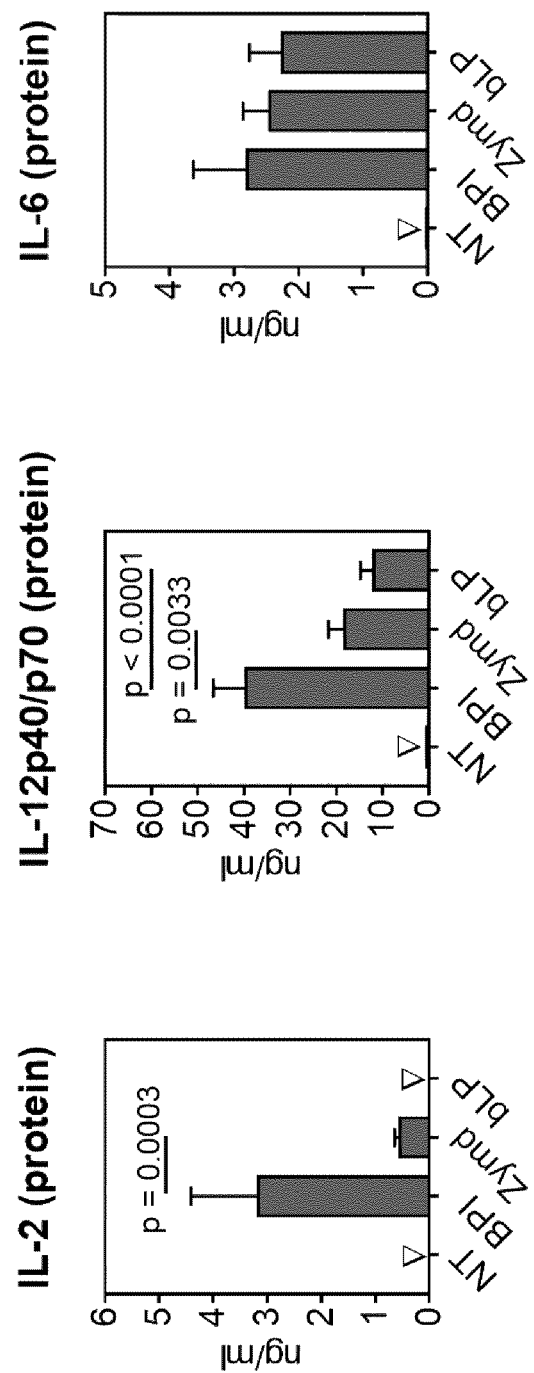

FIG. 3 shows expression of IL-2, IL-12p40, and IL-6 after stimulation with BPI, Zymosan depleted (Zymd), and a bacterial lipopeptide (bLP, (R)-Pam3CSK4). BPI is a superior stimulus especially towards IL-2 secretion as compared to adjuvants like TLR and CLR ligands. Importantly, Zymd is known for its high potency to induce of IL-2 in BMDCs. However, BPI is a more potent inductor of IL-2.

The stimulatory effect of BPI on the expression of IL-2 and IL-12p40/p70 in murine DCs significantly exceeds the stimulatory effect of Zymd and bLP, whereas the stimulatory effect of BPI, Zymd, and bLP on the expression of IL-6 is similar, as observed using Luminex (n>7, 4h, mean±standard error of the mean, ratio paired student's t test).

Figure 4:
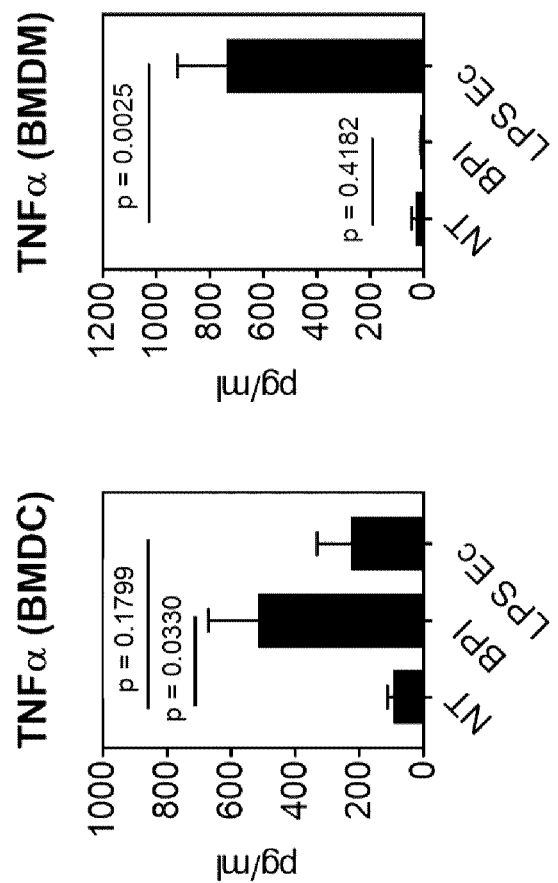

FIG. 4 shows expression of TNFα in murine dendritic cells (BMDC) and murine macrophages (BMDM) upon stimulation with BPI and LPS Ec. BPI preferentially stimulates cells that are subtypes of immune cells, particularly subtypes of antigen-presenting cells, such as dendritic cells as shown for BMDCs. No induction of TNFα by BPI is seen in BMDMs.

A. DCs react towards both stimuli with secretion of TNFα (n>3, 18h, mean±standard error of the mean, paired student's t test).

B. Macrophages respond to LPS Ec but not to BPI as observed by ELISA (n>3, 18h, mean±standard error of the mean, paired student's t test).

Figure 5:
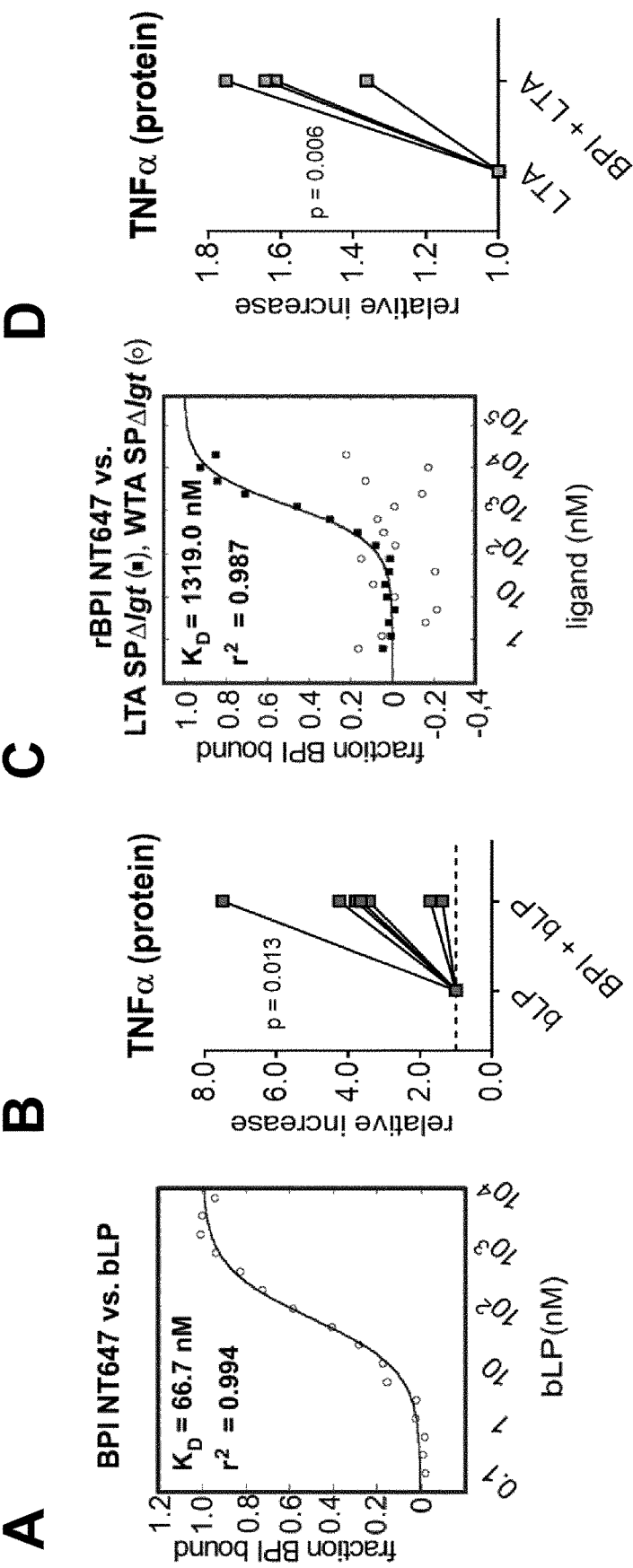

FIG. 5 shows experimental data addressing the synergism of BPI and bacterial lipopeptides (bLPs) in stimulation of immune cells. A synergistic immunostimulatory effect was observed for BPI in combination with bLP in human peripheral blood mononuclear cells.

A. Binding of bLP by BPI as exemplified for (R)-Pam3CSK4 (microscale thermophoresis, MST).

B. Synergism of BPI and bLP in the stimulation of human peripheral blood mononuclear cells (TNFα ELISA, n=7, 18h, mean±standard error of the mean, paired student's t test).

C. Binding of LTA SP by BPI (microscale thermophoresis, MST), but no binding of WTA SP.

D. Synergism of BPI and LTA SP in the stimulation of human peripheral blood mononuclear cells (TNFα ELISA, n=4, 18h, mean±standard error of the mean, paired student's t test).

Figure 6:
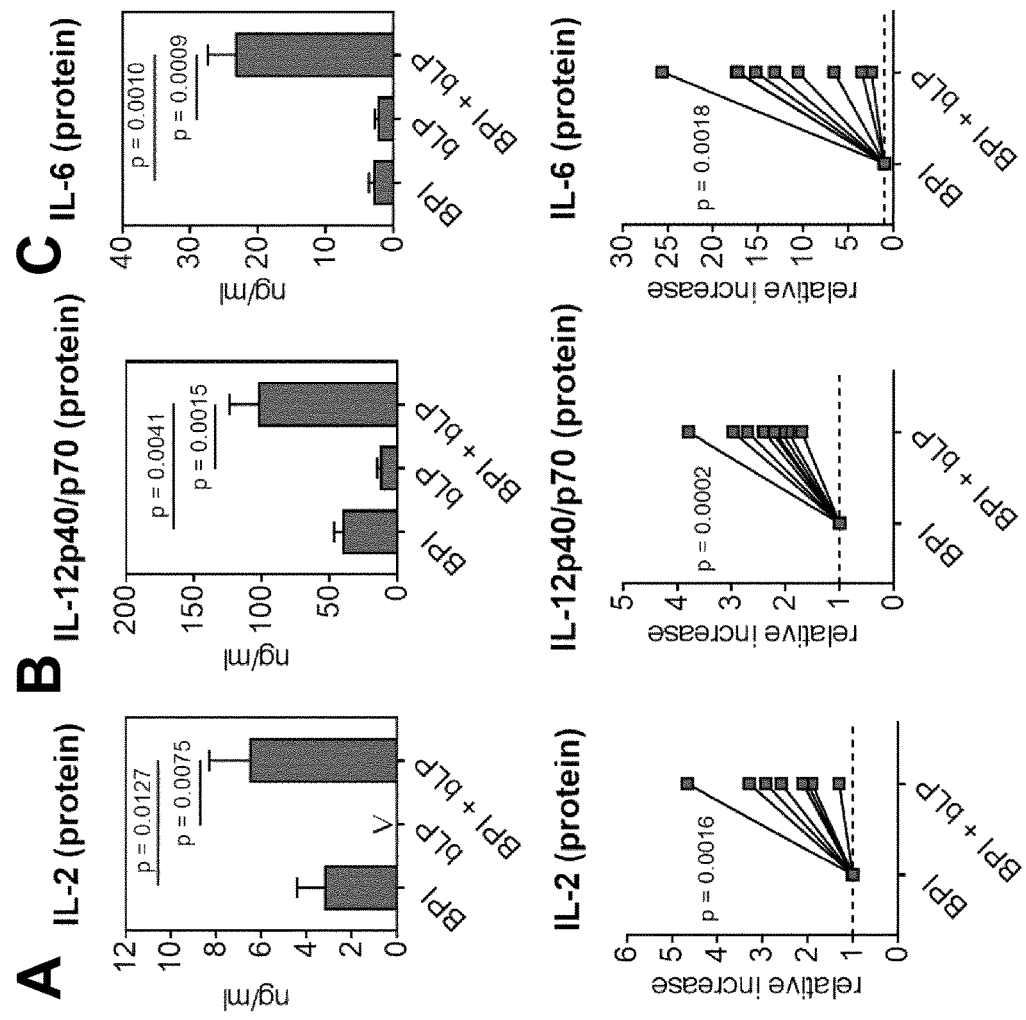

FIG. 6 shows experimental data addressing the synergism of BPI and bacterial lipopeptides (bLPs) in the stimulation of immune cells. A synergistic immunostimulatory effect was observed for BPI in combination with bLP in murine dendritic cells as indicated by the increase of IL-2, IL-12p40 and IL-6 expression (Luminex, n=9).

A. Synergism of BPI and bLP in the stimulation of IL-2 expression in murine dendritic cells (upper and lower panel).

B. Synergism of BPI and bLP in the stimulation of IL-12p40/p70 expression in murine dendritic cells (upper and lower panel).

C. Synergism of BPI and bLP in the stimulation of IL-6 expression in murine dendritic cells (upper and lower panel).

Figure 7:
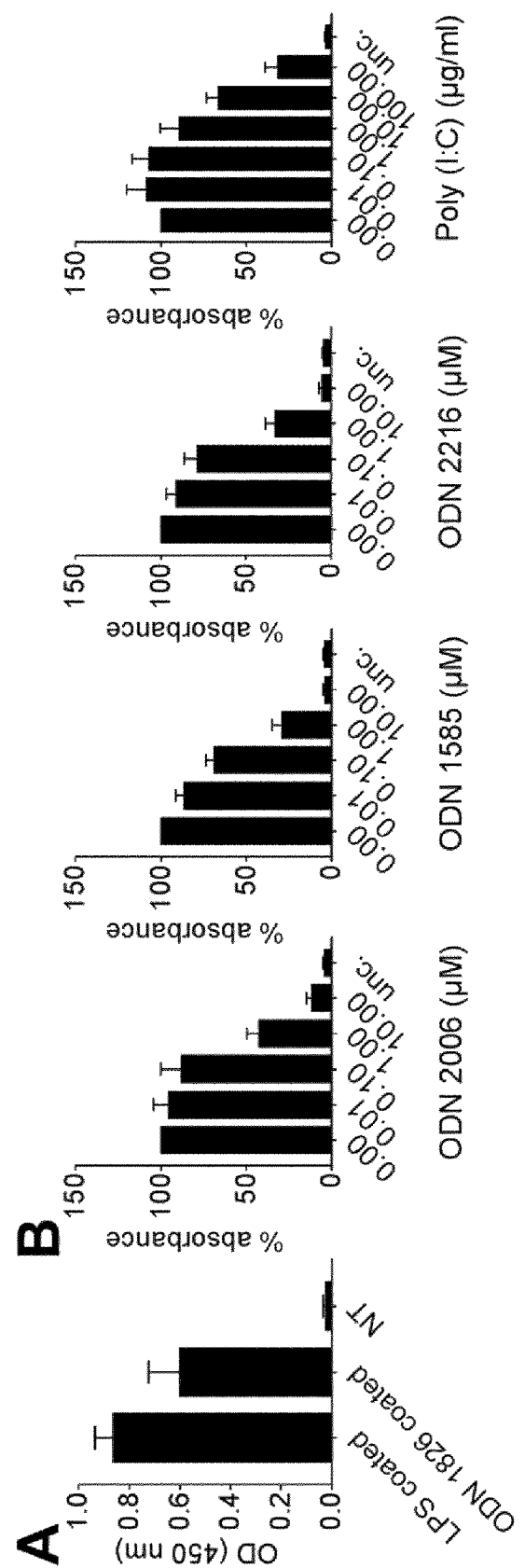

FIG. 7 depicts the binding of BPI to TLR ligands. Binding as well as competitive binding was present for the TLR9 agonist CpG ODN of different types and sequences and for the TLR3 agonist Poly(I:C).

A. Streptavidin-coated plates were incubated with biotinylated LPS or biotinylated ODN 1826 (Type B CpG ODN, n=4, mean±standard deviation). Binding of BPI to both LPS and CpG ODN was observed.

B. Streptavidin-coated plates were incubated with biotinylated ODN 1826 (n=3, mean±standard deviation). Competition of binding was assessed for different variants of CpG ODNs (ODN 2006 and ODN 2216: Type A CpG ODN, ODN 1585: Type B CpG ODN) and the TLR3 agonist Poly(I:C) in ODN 1826 coated plates.

Figure 8:
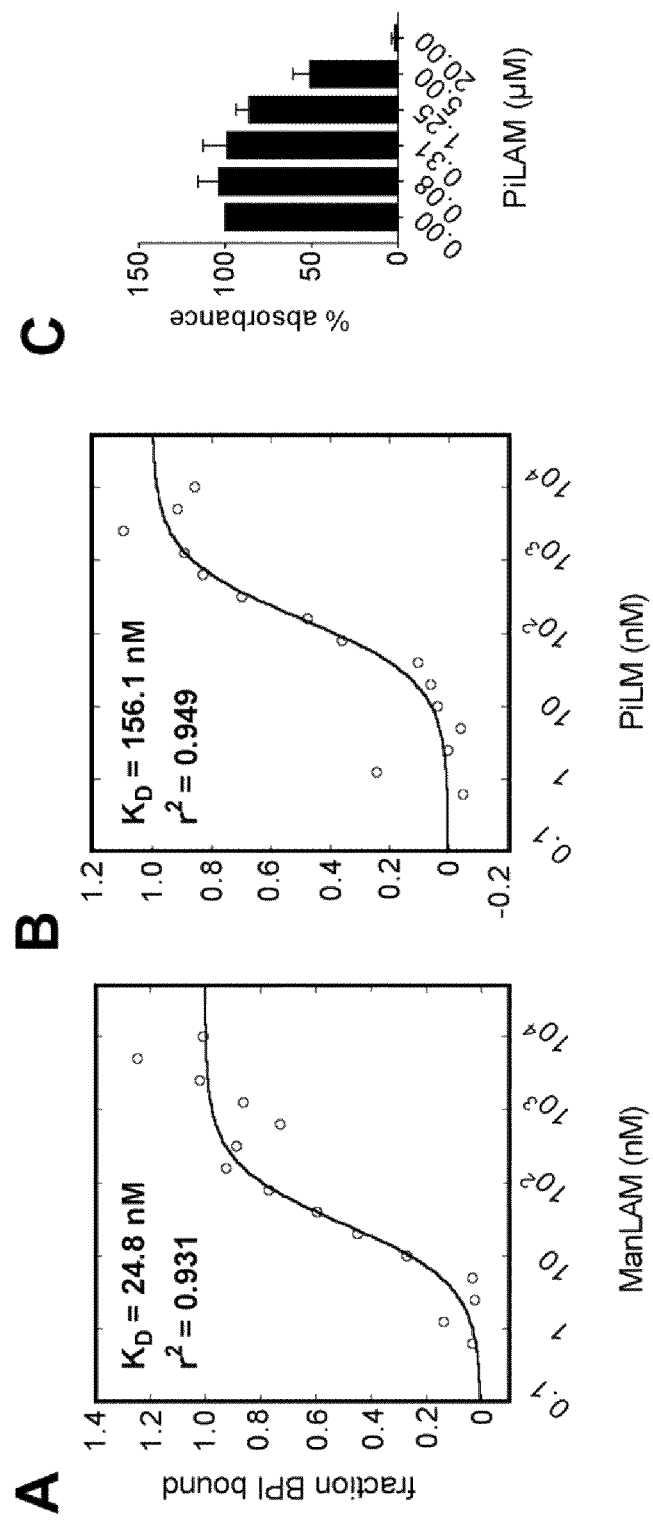

FIG. 8 depicts binding of lipoarabinomannans and the lipoarabinomanan derivate PiLM by BPI.

A. Binding of ManLAM to BPI is shown in microscale thermophoresis (MST) is shown (mean of two replicates).

B. Binding of phosphatidyl-inositol lipomannan (PiLM) to BPI is shown in microscale thermophoresis (MST) is shown (mean of two replicates).

C. Streptavidin-coated plates were incubated with biotinylated LPS (n=3). Competition of binding was assessed for lipoarabinomannan as exemplified for phosphatidyl-inositol lipoarabinomannan (PiLAM).

Figure 9:
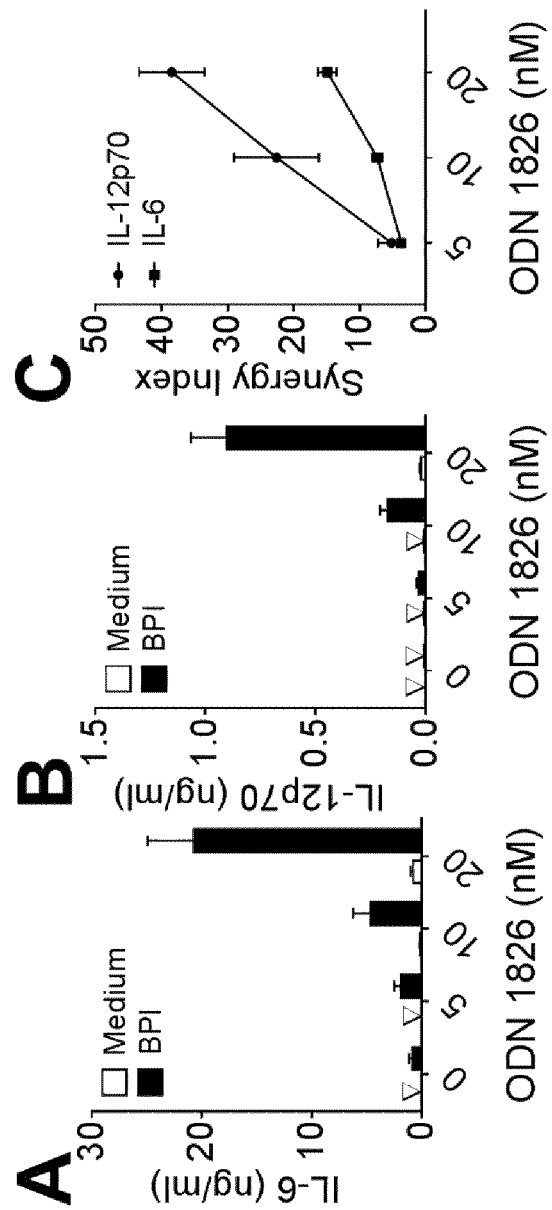

FIG. 9 shows that the combination of BPI and CpG ODN induces a synergistic induction of IL-6 and IL12-p70. Bone-marrow derived dendritic cells (BMDCs) were incubated with a combination of BPI (100 nM) and low-dose CpG ODN (ODN 1826, TLR9-agonist, concentration as indicated).

A. IL-6 was measured by Luminex 18 h post stimulation (n=4, mean±standard error of the mean).

B. IL-12p70 was measured by Luminex 18 h post stimulation (n=4, mean±standard error of the mean).

C. Synergistic induction (SI) was calculated for both cytokines (C). For the calculation of SI, the cytokine concentration after adding the combination of both substances was divided by the the sum of cytokine concentrations after stimulation with the single substances.

Figure 10:
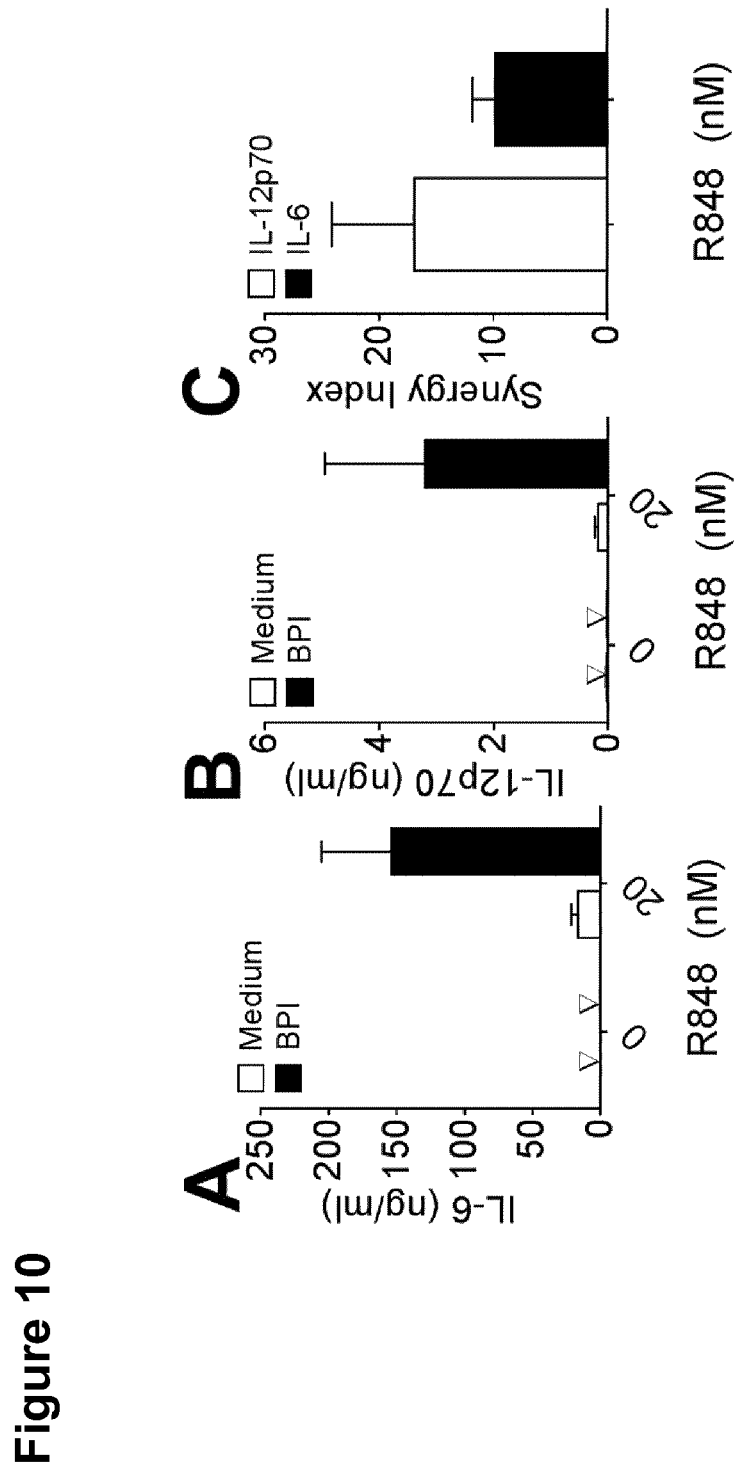

FIG. 10 shows that the combination of BPI and R848 induces a synergistic induction of IL-6 and IL12-p70. Bone-marrow derived dendritic cells (BMDCs) were incubated with a combination of BPI (100 nM) and low-dose R848 (Resiquimod, TLR7 and TLR8 agonist, nM).

A. IL-6 was measured after 18 h (n=3, mean±standard error of the mean).

B. IL-12p70 was measured after 18 h (n=3, mean±standard error of the mean).

C. Synergistic induction (SI) was calculated for both cytokines (C). For the calculation of SI, the cytokine concentration after adding the combination of both substances was divided by the the sum of cytokine concentrations after stimulation with the single substances.

Figure 11:
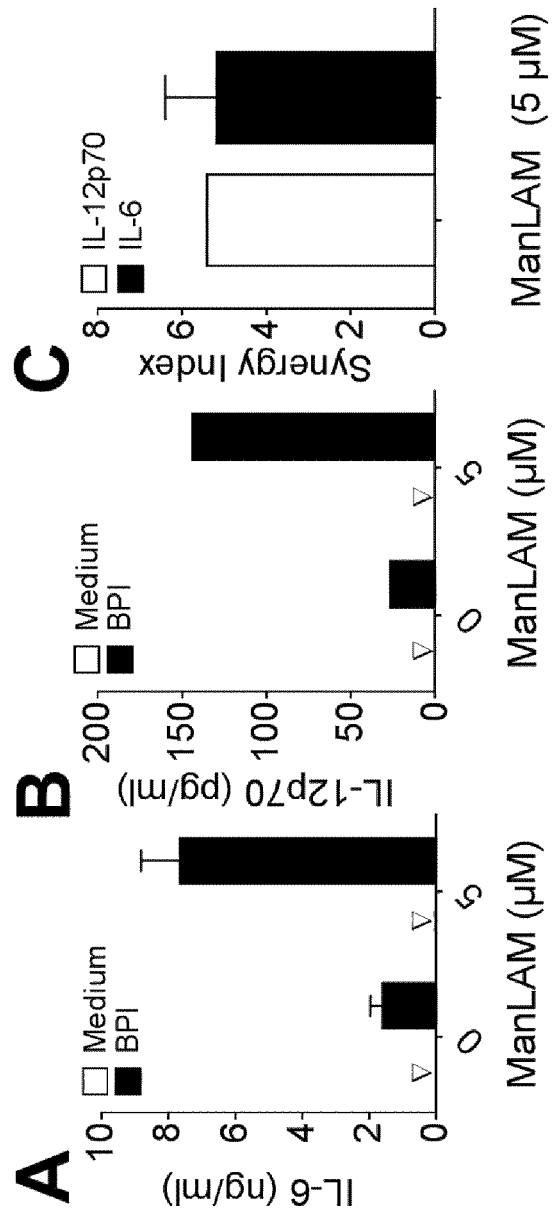

FIG. 11 shows that the combination of BPI and ManLAM induces a synergistic induction of IL-6 and IL12-p70. Bone-marrow derived dendritic cells (BMDCs) were incubated with a combination of BPI (100 nM) and ManLAM (C-type lectin receptor agonist, 5 µM).

A. IL-6 was measured after 18 h (n=3, mean±standard error of the mean).

B. IL-12p70 was measured after 18 h (n=1, mean±standard error of the mean).

C. Synergistic induction (SI) was calculated for both cytokines (C). For the calculation of SI, the cytokine concentration after adding the combination of both substances was divided by the the sum of cytokine concentrations after stimulation with the single substances.

Figure 12:
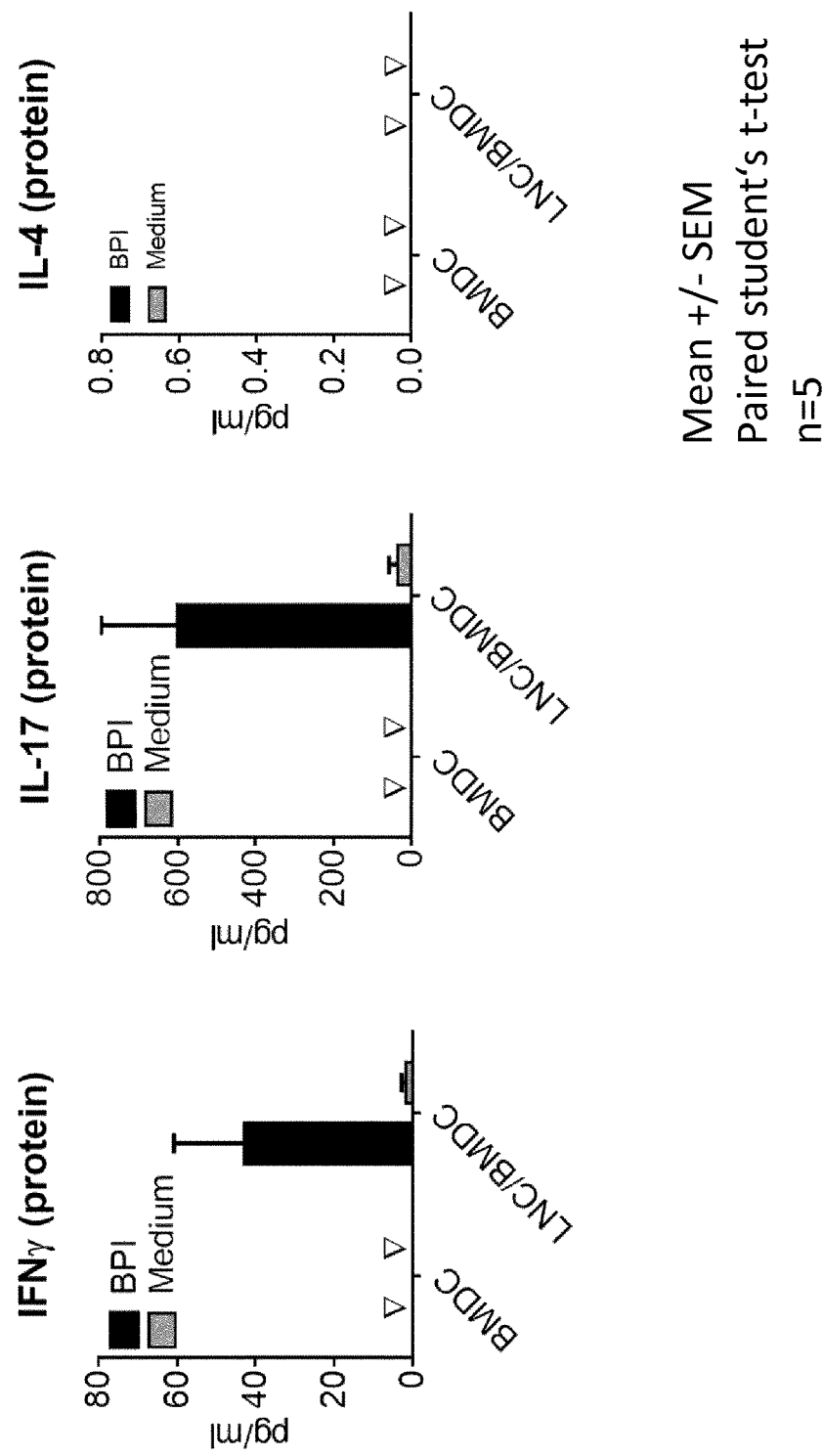

FIG. 12 shows effects of BPI on co-culture of lymphnode cells (LNCs) and dendritic cells (DCs, n=5). BPI stimulates secretion of IFNγ (Th1), IL-17 (Th17), and does not stimulate secretion of IL-4 (Th2) in this co-culture of LNCs and DCs experiment. Thus, in this setting BPI promotes Th1 and Th17 cell differentiation, and does not promote Th2 cell differentiation. IFNγ and IL-17 secretion is not observed in a BMDC mono-culture or without addition of BPI to the co-culture of LNC and BMDCs (Medium).

Figure 13:
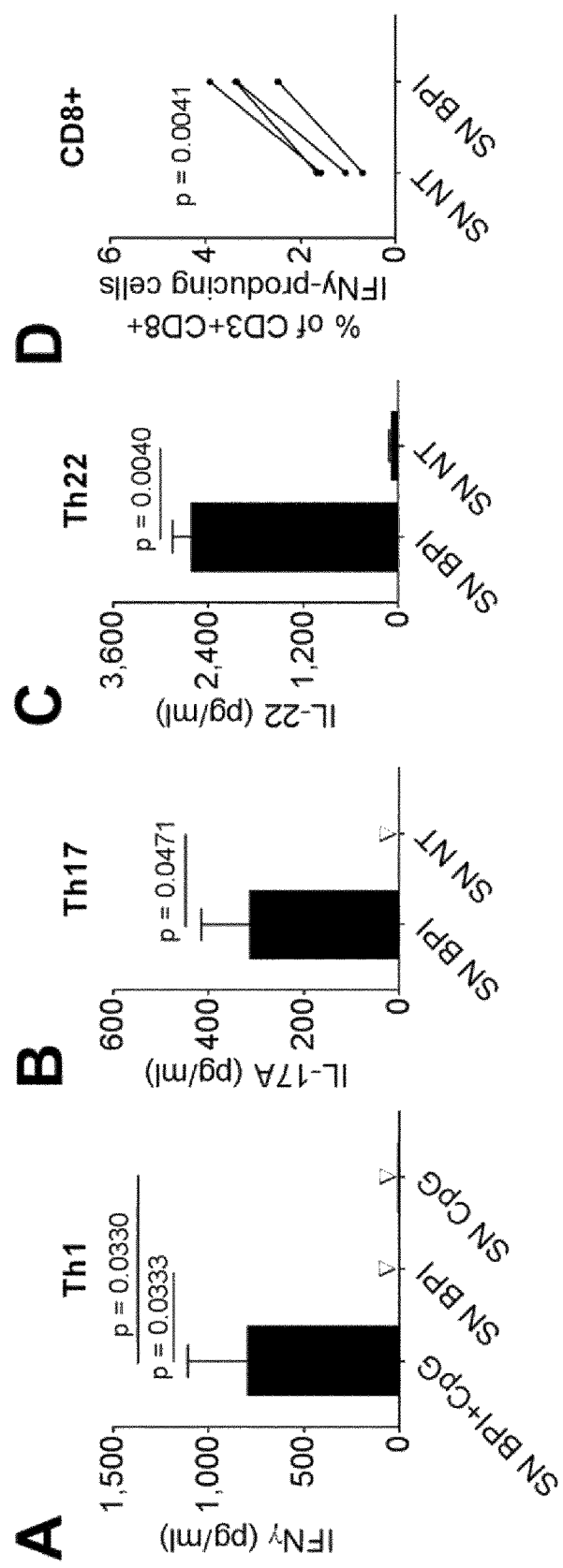

FIG. 13 shows that BPI stimulation activates naïve CD4+ and CD8+ T cells. Naive CD4+CD25-CD44-CD62L+ T cells were isolated from peripheral lymph nodes and spleen of C57BL/6J mice and purified by MACS and FACS. Naïve CD4+ T cells were cultured in the presence of aCD3 and aCD28 antibodies and dendritic cell-derived supernatant after stimulation with BPI (SN BPI, BPI 200 nM) or after stimulation with ODN 1826 (SN CpG, ODN 1826 20 nM) or after stimulation with BPI and ODN 1826 (SN BPI+CpG, BPI 200 nM, ODN 1826 20 nM) or supernatant without addition of BPI or ODN 1826 (SN NT). On day five, cytokine levels were measured by Luminex.

A. Th1 differentiation as shown by detection of IFNγ (n=3).

B. Th17 differentiation as shown by detection of IL-17 (n=3).

C. Th22 differentiation as shown by detection of IL-22 (n=3).

D. Activation of CD8+ T cells as shown by production of IFNγ (n=4). Lymph node cells were stimulated with aCD3 and aCD28 antibodies and SN BPI or SN NT and incubated for 6h before adding a protein transport inhibitor cocktail and incubating for additional 16h. Cells were fixed and permeabilized and stained for CD3, CD4, CD8, and IFNγ. Lines are connecting the amount of IFNγ-producing CD3+CD8+ T cells after treatment with SN BPI or SN NT for 24h.

Bars represent the means±standard error of the mean. Statistics for comparison were performed with the paired Student's t-test (A to C) or the ratio paired Student's t-test (D).

Figure 14:
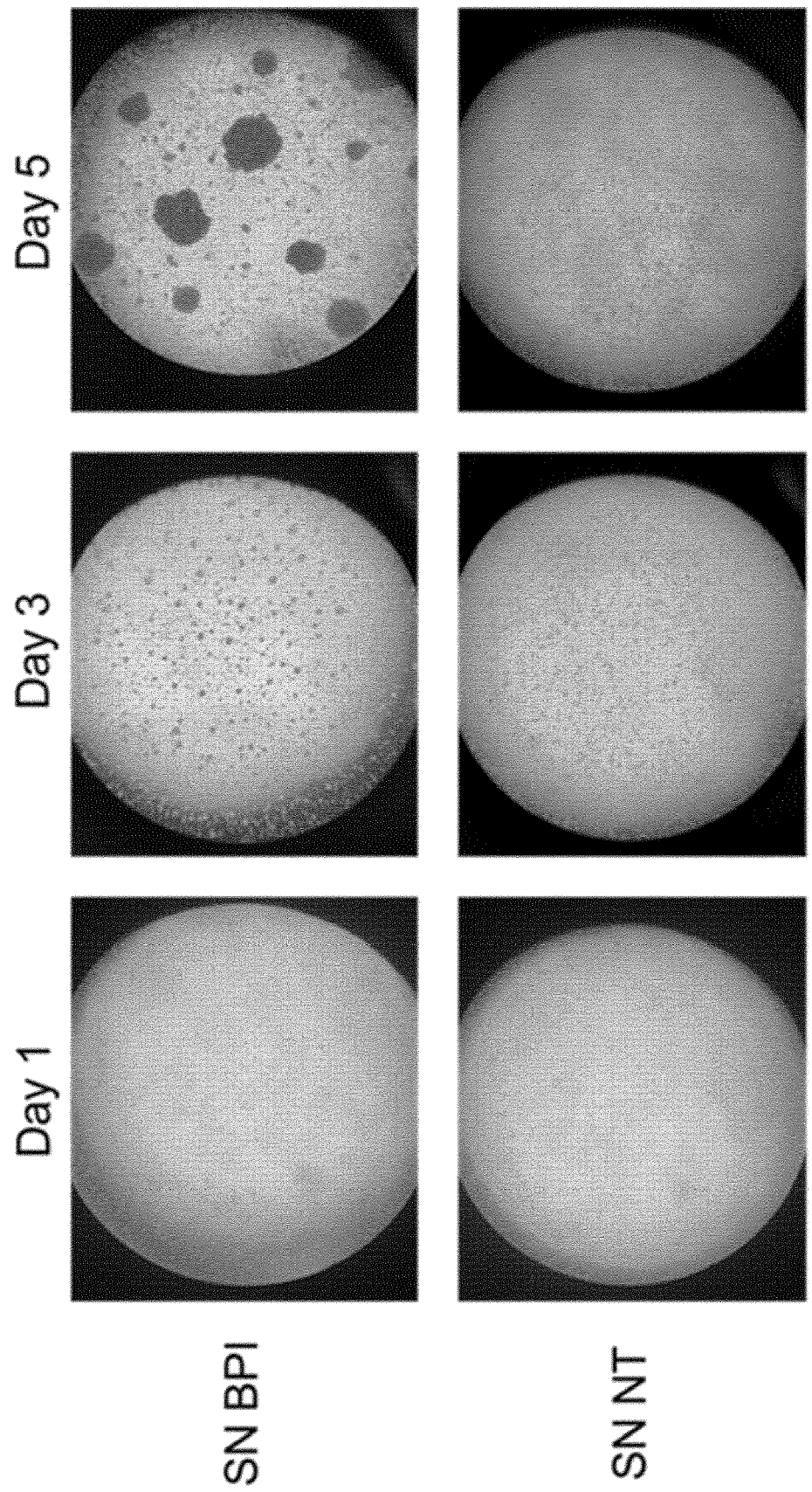

FIG. 14 shows that SN BPI induces differentiation and proliferation in naïve CD4+ T cells (magnification 100×). Representative images of naïve CD4+ T cell proliferation in T cell stimulation assay shown in FIG. 13 after stimulation with SN BPI or SN NT for one, three or five days.

Figure 15:
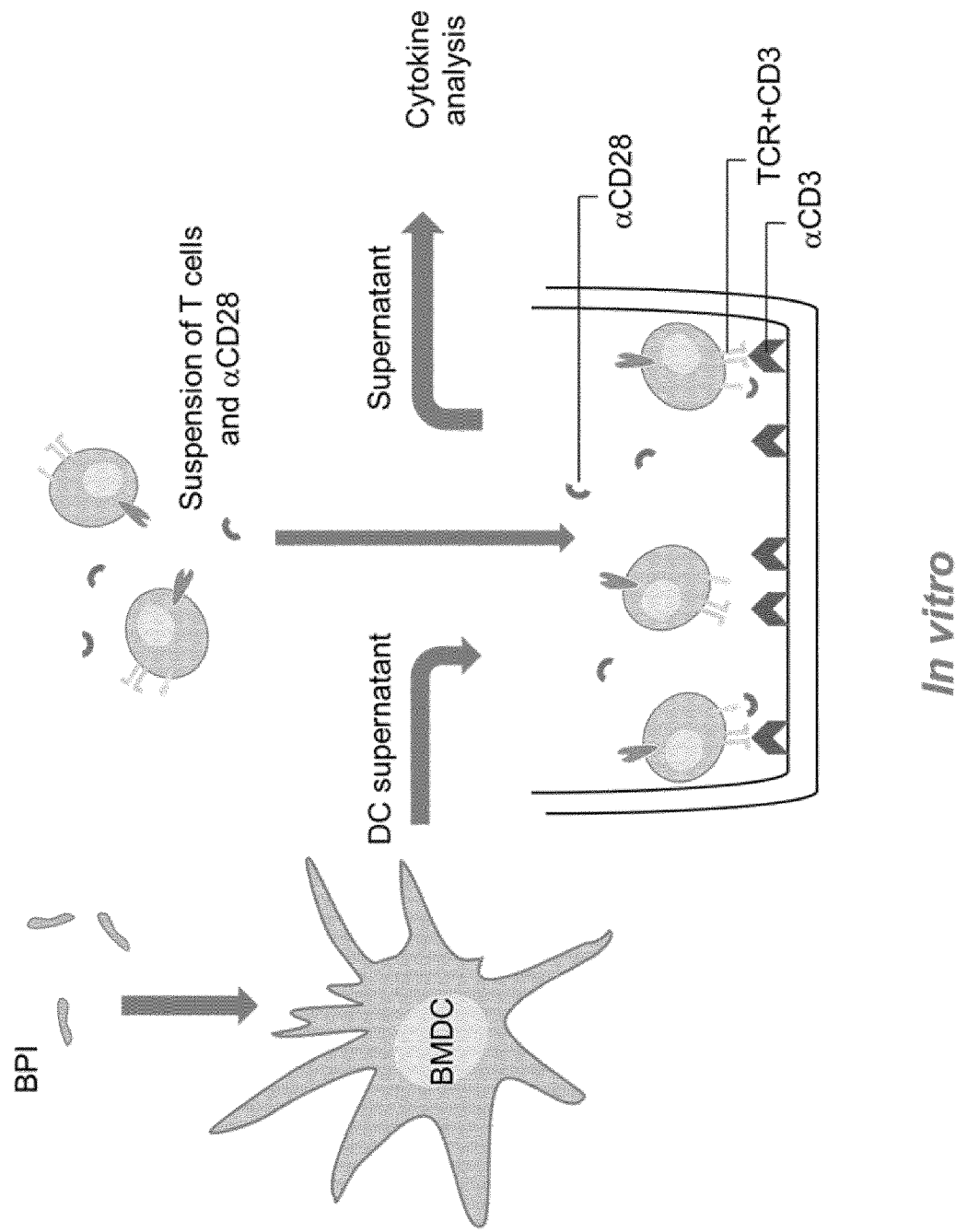

FIG. 15 is a schematic representation of the T cell activation assay.

In the following, reference is made to the examples, which are given to illustrate, not to limit the present invention.

EXAMPLES

Example 1

BPI Upregulates Costimulatory Receptors/Maturation Markers in BMDCs

Generation of Recombinant Human BPI

A pCR3 vector (Invivogen) construct comprising an N-terminal HA signal peptide, aa32-487 of the huBPI respectively aa28-483 of muBPI, was transfected into HEK293T cells and used for the experiments after purification.

Generation of GM-CSF Derived Murine BMDCs

BMDCs were generated from the bone marrow of male C57BL/6J mice at the age of approximately 3 to 7 months, which were bred under SPF conditions. BMDCs were generated as previously described [7]. BMDCs were harvested on day 7 by rinsing the dish in order to obtain the non-adherent and loosely-adherent cell fractions.

Cell Stimulation $5 \times 10^4$ BMDCs per well were seeded into a tissue-culture-treated 96-well plate in VLE-RPMI 1640 media (10% FCS, 10% Penicillin-Streptomycin, 50 UM β-Mercaptoethanol) and stimulated with 200 nM huBPI.

Fluorescence-Activated Cell Sorting (FACS)

BMDCs were stimulated with huBPI (200 nM) for 18 h. After the stimulation period, the stimulated and unstimulated cells were incubated with Fc-Block and stained using the indicated antibodies (Table 1) and the respective isotype controls (Table 2). 7-Aminoactinomycin D (7-AAD, #00-6993-50, eBioscience) positive stained cells were excluded from the analysis. Flow cytometry measurement was performed using the instrument BD FACS Canto™ II (BD Bioscience). Data was analyzed using BD FACSDiva™ software v.7.0 (BD Bioscience) as well as FlowJo v.10 (Tree Star).

TABLE 1

FACS antibodies

| Antigen | Conjugate | Clone | Subtype | Concentration | Catalog-# | Manufacturer |
|---|---|---|---|---|---|---|
| CD16/CD32 | — | 2.4G2 | Rat IgG$_{2b}$, K | 1 ng/μL | 553142 | BD[1] |
| CD11C | VioBlue | REA754 | hu IgG1 | 3 ng/μL | 130-110-843 | Miltenyi[2] |
| CD80 | PE | 16-10A1 | hamster IgG2K | 1.5 ng/μL | 130-102-883 | Miltenyi[2] |
| CD86 | FITC | PO3.3 | rat IgG2bK | 1.5 ng/μL | 130-102-506 | Miltenyi[2] |
| CD40 | APC | FGK45.5 | rat IgG2a | 3 ng/μL | 130-102-547 | Miltenyi[2] |

[1]BD Biosciences;
[2]Miltenyi Biotec

TABLE 2

Isotype controls

| Antigen | Conjugate | Clone | Subtype | Catalog-# | Manufacturer |
|---|---|---|---|---|---|
| Iso REA | VioBlue | REA293 | hu IgG1 parts | 130-104-625 | Miltenyi[2] |
| Iso hamster IgG2K | PE | B81-3 | Hamster IgG2K | 550085 | BD[1] |
| Iso rat IgG2b | FITC | ES265E12.4 | Rat IgG2bK | 130-103-088 | Miltenyi[2] |
| Iso rat IgG2a | APC | ES26-15B7.3 | Rat IgG2aK | 130-103-092 | Miltenyi[2] |

[1]BD Biosciences;
[2]Miltenyi Biotec

Figure 1:
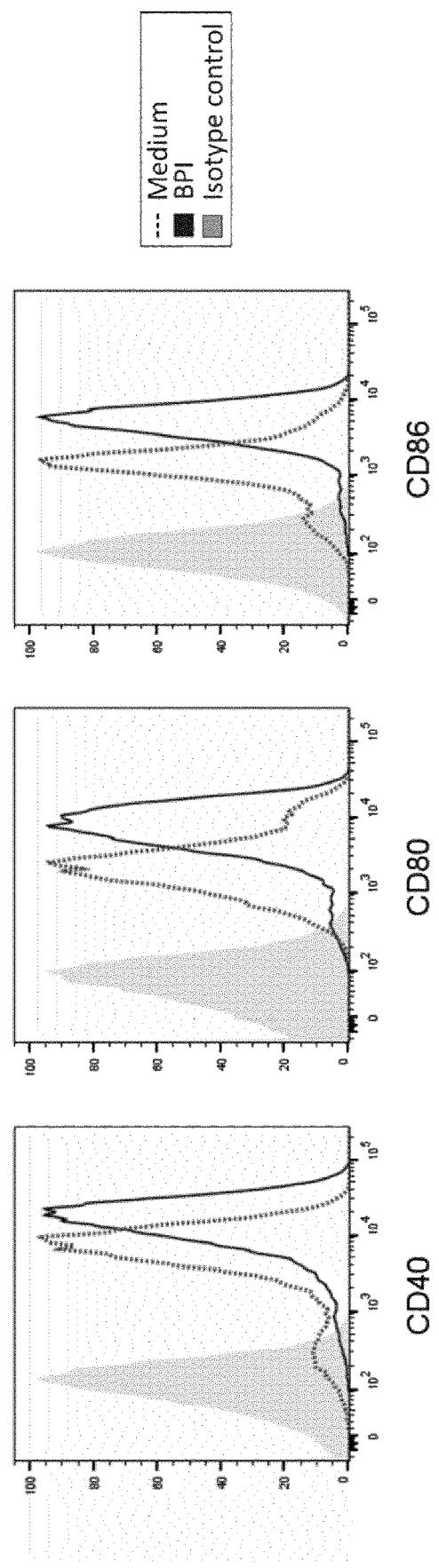
FIG. 1 shows FACS analysis data showing surface expression of maturation markers/costimulatory molecules, which are required for T cell activation by bone marrow derived dendritic cells (BMDCs). When BPI is used to stimulate said cells, it upregulates these maturation markers/costimulatory molecules in such stimulated cells compared to unstimulated cells (n=4).

According to the data presented in FIG. 1, BPI promotes expression of costimulatory receptors CD40, CD80, and CD86, which promote T cell activation.

Example 2

BPI Modulates Cytokine Gene Expression in BMDCs

Figure 2:
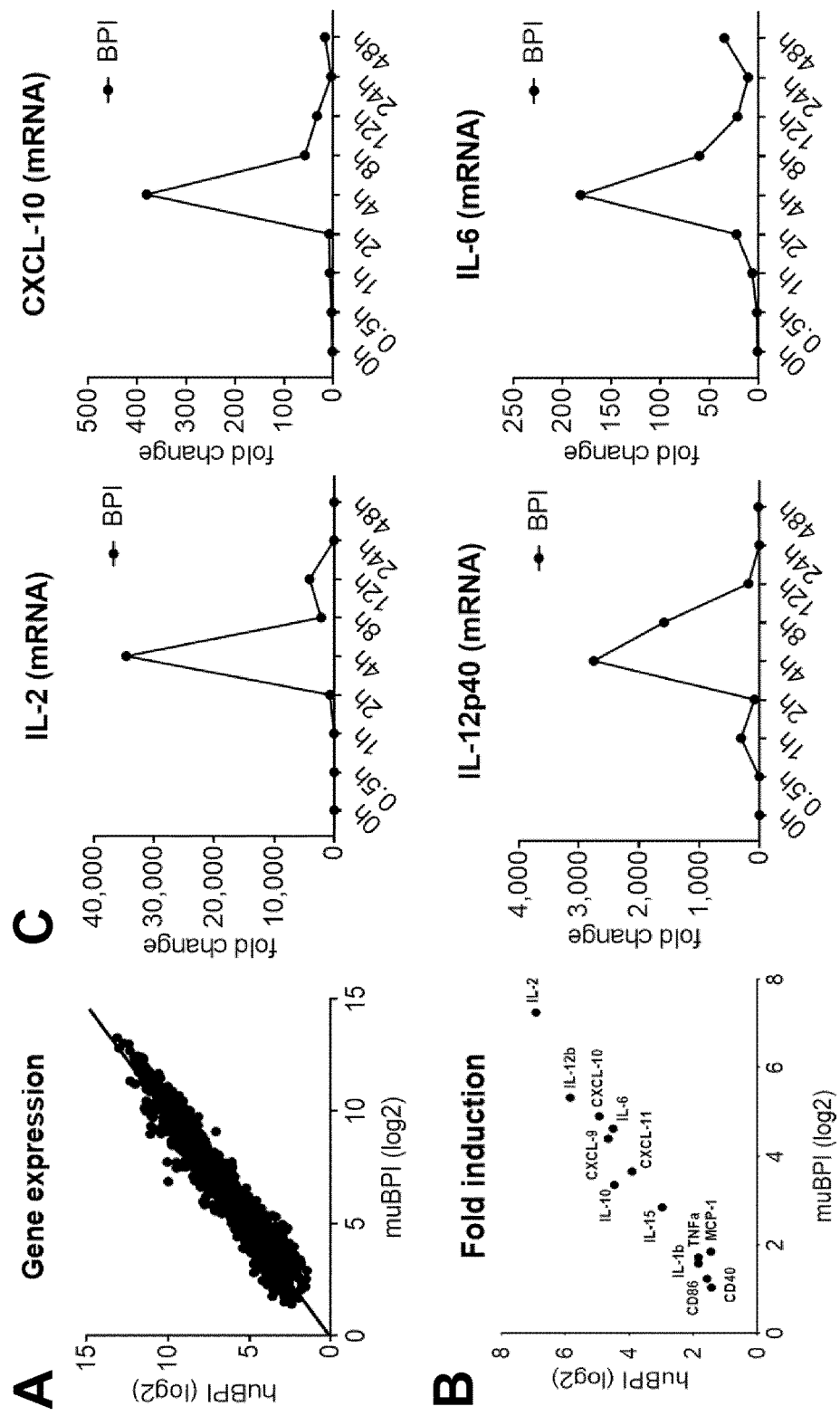
FIG. 2 shows the influence of BPI on dendritic cells (DCs). Human and murine BPI induce comparable genes in bone-marrow derived dendritic cells indicating no species barrier. When BPI is used to stimulate said cells, it induces expression of IL-2, IL-12p40, IL-6, CXCL10, and others, in such stimulated cells compared to unstimulated cells. This indicates that BPI promotes secretion of IL-2, IL-12, and CXCL10, and thus Th1 cell differentiation, and IL6 to promote Th17, Th22 and Tfh differentiation.

All methods mentioned in this example were carried out as described in Example 1. BMDCs were seeded into a tissue-culture-treated 96-well plate in VLE-RPMI 1640 media (10% FCS, 10% Penicillin-Streptomycin, 50 μM β-Mercaptoethanol) and stimulated with 200 nM huBPI or muBPI. 4 h after stimulation, gene expression analysis was performed by microarray analysis (Affymetrix Mouse Gene 2.0 ST, FIGS. 2A and 2B).

Gene Expression Analyses (Quantitative Real-Time PCR)

Gene expression analyses using rtPCR were performed 30 min, 1 h, 2 h, 4 h, 8 h, 12 h, 24 h and 48 h after the stimulation.

After stimulation, cells were lysed and RNA was isolated using RNeasyR Mini Kit (#74106, Qiagen). Remaining DNA in the sample was digested using TURBO DNA-free™ Kit (#AM1907, ThermoFisher Scientific). Finally, the RNA concentration was measured with a NanoDrop 1000 (Thermo Scientific). The isolated RNA was transcribed into complementary DNA (cDNA) using the iScript™ Advanced cDNA Synthesis Kit (#1725038, Bio-Rad).

To analyze altered gene transcription, in particular of genes CXCL10, HPRT, IL-2, IL-6, and IL-12p40, in response to different stimulatory reagents, quantitative real-time PCR (qRT-PCR) was performed using SYBR-Green Master Mix (LightCycler® 480 SYBR Green I Master, #4707516001, Roche). Gene-specific primers synthesized by Thermo Fisher Scientific, Microsynth, Biomers, and Metabion were used. PCR reaction was performed using the HT 7900 Real-Time PCR system (Applied Biosystems). SDS software version 2.4 (Applied Biosystems) was used to analyze the gene expression, which was normalized to the housekeeping gene HPRT. $2^{-\Delta\Delta C_T}$ method was used to analyze the data.

Both human and murine BPI shows an immunostimulatory effect on BMDCs (FIG. 2A). Upon stimulation with BPI BMDCs an increase of CXCL10, IL-2, IL-6, and IL-12p40 mRNA expression is seen (FIGS. 2B and C).

Example 3

BPI Modulates Cytokine Protein Secretion by BMDCs

All methods mentioned in this example were carried out as described in the preceding examples. Cells were stimulated with Zymosan depleted (Zymd, 5 µg/ml) from Invivogen (San Diego, CA, USA) or (R)-Pam$_3$CSK$_4$ (bLP, 10 nM) from EMC Microcollections GmbH (Tübingen, Germany). Protein secretion analysis was performed using the supernatants.

Protein Quantification by Luminex Technology

To quantify the interleukin and chemokine protein-level after stimulation with huBPI, Zymd, and (R)-Pam CSK$_4$, a multiplex-system was used and determined by using the Luminex® technology (Austin, TX, USA). The cytokines were captured with anti-mouse capture-antibodies and detected by biotinylated antibodies specific for the respective protein (Table 3). Protein concentrations were calculated using a reconstituted standard curve of the analyzed proteins (SM039, #LMC4031, Lot #1438354; Thermo Fisher Scientific; Standard Mix 1a, #EPX010-20603-901, Lot #111709101, eBioscience).

TABLE 3

Material for protein quantification of the different proteins by ELISA or Luminex technology

| Cytokine | Antibodies | Manufacturer |
| --- | --- | --- |
| CXCL10 | ELISA Set, #900-M153 | Peprotech |
| IL-2 | #554424, #554426 | BD Biosciences |
| IL-6 | ELISA Set, #555240 | BD Biosciences |
| IL-12p40/p70 | #551219, #554476 | BD Biosciences |
| TNFα | ELISA Set, #558534 | BD Biosciences |

BPI shows an immunostimulatory effect on BMDCs, such as increase of IL-2, IL-12p40/p70, and IL-6 protein secretion (FIG. 3). The increase of IL-2 and IL12p40/p70 is significantly higher compared to Zymd and bLP, whereas the IL-6 level is comparable. Therefore, BPI is a very effective inductor of IL-2, which is a central cytokine for induction of lymphoid cells such as Th cells and CD8+ T cells.

Protein levels of proteins involved in T cell activation (IL-2), and of proteins involved in promotion of Th1 cells (IL-2, IL-12p40/p70), Th17 cells (IL-6), Th22 cells (IL-6 and TNFα), and cytotoxic T cells (IL-2), were increased after BPI treatment (FIG. 3 and FIG. 4), whereas the IL-4 level was not induced by BPI in BMDCs (FIG. 12).

Example 4

BPI Preferentially Stimulates Subtypes of Antigen-Presenting Cells as Shown Comparing Murine Dendritic Cells and Macrophages All methods mentioned in this example were carried out as described in Example 1 and 2.

Generation of BMDM was carried out similarly to BMDCs; MCSF was used instead of GMSCF for differentiation of BMDM. Cells were re-plated on day 1 of culture and harvested on day 5. On day 1, cells were seeded in new plates and harvested on day 5 for the experiments. Cells were stimulated with LPS Ec (10 ng/ml) or BPI (100 nM) for 18 h before supernatants were collected. TNFα levels were determined by ELISA (OPTEIA™ Murine TNFα ELISA Set, BD Bioscience, Heidelberg, Germany).

Dendritic cells secrete TNFα in response to stimulation with BPI and LPS Ec, whereas macrophages secrete TNFα in response to stimulation with LPS Ec but not in response to stimulation with BPI (FIG. 4).

Accordingly, BPI preferentially stimulates antigen-presenting cells such as dendritic cells ensuring an efficient antigen-presentation and a reduction of side effects caused by stimulation of other cells when used in vivo.

Example 5

BPI Binds to bLPs and LTA, and Shows a Synergistic Immunostimulatory Effect in PBMCs when Coadministered MicroScale Thermophoresis Experiments BPIN (A) and rBPI were labeled with NT647 in PBS pH 7.4 (Monolith NT™ Protein Labeling Kit RED-NHS, NanoTemper Technologies, Munich, Germany). Concentration of labeled protein was determined using the NanoDrop (ThermoScientific, Wilmington, NC, USA) and Bradford assay (Promega, Mannheim, Germany). MST binding experiments were carried out with 5 nM labeled protein in binding buffer (10 mM HEPES pH 7.4, 150 mM NaCl, 0.1% Tween) with 0.196-6,436 nM of Pam$_3$CSK$_4$ (bLP), or 0.61-20,000 nM of LTA SPΔlgt (LTA), or >0.61-20,000 nM WTA SPΔlgt (WTA) at 20%-40% MST power, 20% LED power in premium capillaries on a Monolith NT.115 pico device at 25° C. (NanoTemper Technologies, Munich, Germany). Pam$_3$CSK$_4$, (bLP) was obtained from EMC Microcollections GmbH (Tübingen, Germany), LTA and WTA were prepared as published previously [8]. MST timetraces were recorded, and the temperature jump and thermophoresis or thermophoresis was analyzed. Binding graphs of each independent experiment were normalized to the fraction bound.

Isolation and Stimulation of Human Peripheral Blood Mononuclear Cells

After informed consent, blood was drawn from healthy male volunteers using heparinized blood collection tubes and PBMCs were separated using leucosep tubes containing FICOLL® PAQUE PLUS (Oxford Immunotec, Abingdon, Great Britian) at 1,000×g for 10 min. The pellet was resuspended in AIM VR Medium (Thermo Fisher Scientific Inc., Waltham, MA, USA), counted, and cultivated in 96-well plates for 4 h (1×10$^5$/100 µl). Then cells were stimulated with (R)-Pam$_3$CSK$_4$ (bLP, 1 nM) or LTA S. pneumoniae Δlgt (a lipoprotein deficient strain, LTA SPΔlgt, 1 µM, n=4) in the presence or absence of BPI (500 nM). The supernatants were collected after 18 h for determination of cytokine concentration by ELISA according to the manufacturer's instructions (OPTEIA™ Human TNFα ELISA Set, BD Biosciences, Heidelberg, Germany).

BPI was shown to bind to bLPs. Affinity of BPI to bLP was within a nanomolar range (FIG. 5A). BPI was also shown to bind to lipoteichoic acids (LTAs). LTAs are another major component of the cell wall of Gram-positive bacteria and is anchored to the cell membrane via a lipophilic anchor. As representative samples, LTA preparations of S. pneumoniae Δlgt (a lipoprotein deficient strain, LTA SP Δlgt) were tested for their BPI binding potential. Despite a conserved structure compared to LTAs, WTAs lack the acyl-anchor of LTAs. MST did not show binding of WTA preparations of S. pneumoniae Δlgt (WTA SP Δlgt) demonstrating specificity of the BPI binding to LTA and its acyl-anchor (FIG. 5). Thus, BPI binds ligands such as LTA in dependence of an acyl-anchor.

Coadministration of BPI and a bLP as well as LTA SP showed a synergistic immunostimulatory effect in upregulation of several cytokines, such as TNFα (FIGS. 5B and D).

Accordingly, the present inventors disclose TLR ligands originating from Gram-positive bacteria as new ligands of BPI. Furthermore, BPI as well as the TLR ligands bLPs and LTAs have a synergistic immunostimulatory effect on PBMCs. Thus, BPI does not only bind to TLR ligands, but also has a synergistic effect when coadministered with a TLR ligand even when BPI alone has a minor effect on this cell type. This indicates interaction and synergistic effects of BPI with ligands displaying an acyl-anchor.

Example 6

BPI and TLR Ligands Show a Synergistic Immunostimulatory Effect in BMDCs

All methods mentioned in this example were carried out as described in the preceding examples. (R)-Pam$_3$CSK$_4$ (bLP, 10 nM) was obtained from EMC Microcollections GmbH (Tübingen, Germany). The TLR9 ligands CpG ODNs (ODN 1826, ODN 2006, ODN 1585, ODN 2216), were from Biomers (Ulm, Germany) and the TLR7/8 ligand R848 was purchased from Invivogen (San Diego, CA, USA).

Coadministration of BPI and a bLP showed a synergistic immunostimulatory effect in upregulation of several cytokines, such as IL-2, IL-12p40/p70, and IL6 (FIG. 6). Coadministration of BPI and the TLR9 ligand CpG ODN (ODN 1826) showed a remarkably high synergistic immunostimulatory effect in upregulation of several cytokines, such as IL-12p70 and IL6 (FIG. 9). Coadministration of BPI and the TLR7/8 ligand R848 also showed a synergistic immunostimulatory effect in upregulation of several cytokines, such as IL-12p70 and IL6 (FIG. 10).

Accordingly, BPI in combination with TLR ligands as exemplified for the TLR2 ligand bLP, the TLR9 ligand CpG ODN and the TLR7/8 ligand R848 synergistically augments expression and secretion of proteins stimulating Th1 cells, Th17 cells, and cytotoxic T cells compared to stimulation with BPI or TLR ligand only.

Example 7

BPI and CLR Ligands Show a Synergistic Immunostimulatory Effect in BMDCs

All methods mentioned in this example were carried out as described in the preceding examples. Mycobacterial ManLAM was obtained from Nacalai Tesque (Kyoto, Japan).

Coadministration of BPI and the CLR ligand ManLAM showed a synergistic immunostimulatory effect in upregulation of several cytokines, such as IL-12p70 and IL6 (FIG. 11).

Accordingly, BPI in combination with the CLR ligand ManLAM synergistically augmented expression and secretion of proteins stimulating Th1 cells, Th17 cells, and cytotoxic T cells compared to stimulation with BPI or ManLAM only.

Example 8

BPI Binds to TLR and CLR Ligands

MST was performed as described for example 5. PiLAM and PiLM were ordered from Invivogen (San Diego, CA, USA). BPI binding assays were performed by incubating Streptavidin-coated 96-well plates (Nunc™ Immobilizer™ Streptavidin F96 clear, Thermo Fisher Scientific, Waltham, MA, USA) with LPS biotin (2 µg/ml) in PBS overnight at 23° C. with gentle agitation. After washing with assay buffer (150 mM NaCl, 50 mM HEPES, Sigma Aldrich, Taufkirchen, Germany) containing 0.01% Casein, plates were blocked with 10 g/l BSA (Sigma Aldrich, Taufkirchen, Germany) at 37° C. and washed again. Thereafter, ligands were preincubated with 20 nM BPI in assay buffer containing 1 g/l BSA for 30 min and loaded onto the plates. Bound BPI was detected by murine anti-human BPI monoclonal antibody (Cat.-No. HM2042, Hycult Biotech, Uden, Netherlands) and HRP-conjugated rabbit anti-mouse IgG (Cat.-No. 315-035-048, Dianova, Hamburg, Germany). TMB (BD OptEIA™ TMB Substrate Reagent Set, BD Biosciences, Heidelberg, Germany) was used as a substrate for peroxidase. After addition of 1 N HCl, absorbance was measured at 450 nm. Absorbance indicates binding, the higher the absorbance the higher the binding of BPI to the coated well. Preincubation with a BPI ligand inhibits binding in a concentration-dependent manner.

BPI was shown to bind to bLPs and lipoteichoic acids (LTAs) in FIG. 5. Additionally, the TLR9 ligands CpG ODNs, the TLR3 ligand Poly(I:C) and the CLR-ligand ManLAM bind to BPI (FIGS. 7 and 8). Additionally, as seen for bacterial lipopeptides and lipoteichoic acids (FIG. 5), binding is conserved for lipomannans and other lipoarabinomannans such as PiLAM containing an acyl-anchor (FIG. 8).

Accordingly, BPI binds to ligands containing an acyl-anchor as exemplified for TLR and CLR ligands such as bLPs, LTAs, ManLAM, PiLAM and PiLM. BPI also binds to ligands consisting of nucleic acids and analoga thereof as exemplified for TLR ligands such as CpG ODNs or Poly(I:C).

Example 9

BPI-Stimulated Dendritic Cells Induce IFNγ and IL-17 Production in Peripheral Lymph Node Cells All methods mentioned in this example were carried out as described in the preceding examples. Peripheral lymph nodes of C57BL/6J mice were collected to obtain lymph node cells. The cells were isolated by pressing the lymph nodes through a 22 µm cell strainer, flushing the homogenate with either RPMI-VLE or PBS, and collecting the cell dispersion in a 50 ml falcon tube. The suspension was centrifuged (300×g, 21° C., 8 min) and the cell pellet was resuspended in 2 to 5 ml of cell culture medium (VLE-RPMI 1640 medium containing glutamine supplemented with 10% heat-inactivated FCS, 10% penicillin-streptomycin and 50 µM sterile-filtered β-Mercaptoethanol). After this procedure the cell suspension was washed once or twice in cell culture medium or PBS by centrifugation (300×g, 21° C., 8 min). BMDCs were seeded and co-cultured with a threefold excess of peripheral lymph node cells in the presence or absence of BPI (200 nM) in in cell culture medium. Supernatans were collected and measured as described in preceding examples.

Significant secretion of IFNγ and Il-17 was only seen in the presence of BPI (FIG. 12). Secretion of IL-4 was not observed in any of these settings.

This experiment indicates that BPI indeed promotes the activation of Th1 and Th17 cells and/or other IFNγ and IL-17 producing cells in the co-culture of dendritic cells and lymph node cells.

Example 10

Supernatant of BPI-Stimulated Dendritic Cells Induce IFNγ and IL-17 Production in CD4+ and CD8+ T Cells Isolation and Sorting of CD4+ Cells To isolate CD4+SC and pLNC, cells isolated from spleen and peripheral lymph nodes (see 2.1.3) were sorted by magnetic cell sorting (MACS), using a CD4+ T cell isolation kit (#130-104-454, Miltenyi Biotec). Isolation was performed according to the manufacturer's protocol. In detail, cells were labeled with biotin-antibodies against CD8 and several non-lymphocyte markers and magnetic anti-biotin beads. CD4+ cells were then isolated by applying the cell suspension onto a LS column inside a strong magnetic field of a MACS separator. The flow-through, containing unlabeled CD4+ cells, was collected and cell number was determined using a hemocytometer. CD4+SC and pLNC were used in experiments or labeled with fluorescent antibodies against non-naïve T cell markers for fluorescence activated cell sorting (FACS) of naïve CD4+ T cells. To isolate naïve CD4+ T cells by FACS, CD4+SC/pLNC where resuspended in 100 μl of cold FACS buffer (PBS, 1% FCS, 0.05% sodium azide (#1.06688, Merck)) per $2 \times 10^6$ cells. Cells where then stained with fluorochromes against T cell markers (25 min, 4° C., protected from light). After staining, cells where washed two times with 2 ml of PBS (800 g, 4° C., 8 min) and then resuspended in 1 ml of cold PBS. Cells where then applied to a 30 μM pre-separation filter (#130-041-407, Miltenyi Biotec) and sorted using FACS Aria. Naïve CD4+ T cells were identified by a CD4-positive, CD25-negative, CD44-negative and CD62L-positive (CD4+ CD25-CD44-CD62L+) phenotype. Fluorescent antibodies used are listed in Table4.

T Cell Activation Assays

T cell activation assays were performed in a 96-well, 48-well or 12-well clear flat bottom TC-treated culture microplate (#353072, #353230, #353225, Falcon), which where coated at 37° C. for 1-2h with a 1:400 dilution of purified hamster anti-mouse aCD3 (#553057, BD) in sterile PBS. After coating, wells where washed twice with the same volume of PBS used for coating. Then, purified hamster anti-mouse aCD28 (#553294, BD) antibodies were diluted 1:250 in respective cell suspensions, e.g. naïve CD4+ T cells suspended in VLE-RPMI 1640 medium containing glutamine supplemented with 10% heat-inactivated FCS, 10% penicillin-streptomycin and 50 μM sterile-filtered β-Mercaptoethanol, and suspensions were applied into coated wells. Supernatans were collected and measured as described in preceding examples.

Intracellular Staining of Surface Markers and Cytokines

All described work steps were conducted on ice. To stain cytokines and surface markers intracellularly, isolated SC, pLNC or mLNC were permeabilized and fixed after stimulation in a T cell activation assays. To avoid secretion of cytokines during incubation, cells were additionally treated with a commercial protein transport inhibitor cocktail (#00-4980-03, ThermoFischer). After seeding, cells were re-stimulated with SN BPI or SN NT and incubated for 6h. For further incubation, protein transport inhibitor cocktail was added to a final concentration of 0,5× and cells were incubated for additional 18 h. After incubation, cells were rinsed from the well and collected in a round bottom polystyrene test tube (#352058, Falcon). Cells were then fixed and permeabilized using the BD Transcription Factor Buffer Set (#562574, BD). In more detail, cells were washed with 1 ml of cold PBS (800 g, 4° C., 8 min) and resuspended in 1 ml of cold PBS. The cell suspension was then applied onto a 30 μM pre-separation filter (#130-041-407, Miltenyi Biotec) and collected in the same tube. Cells were then stained with a fixable viability stain (#565388, BD) for 30 min. After staining, cells where washed twice with 2 ml of FACS buffer (300 g, 4° C., 8 min) and then resuspended in 100 μl of FACS buffer. To avoid background staining, cells were treated with FC block in a 1:500 dilution for 10 min in the dark and were then washed two times 1 ml FACS buffer (300 g, 4° C., 8 min). Cells were then fixed and permeabilized for 45 mins in 1 ml fixation/permeabilization reagent. After fixation, cells were washed twice with 1 ml of perm/wash solution (350 g, 4° C., 5 min) and stained with fluorescent antibodies and respective isotype controls (Table4).

TABLE 4

Fluorescent antibodies used for FACS analysis and sorting

| Antigen | Catalog# | Manufacturer |
| --- | --- | --- |
| CD3 | 663066 | BD Biosciences |
| CD4 | 553052 | BD Biosciences |
| CD8 | 1550-02 | Southern Biotec |
| CD25 | 130-120-697 | Miltenyi Biotec |
| CD44 | 553133 | BD Biosciences |
| CD62L | RM4304-3 | Caltag |
| INFγ | 554412 | BD Biosciences |

Protein Quantification by Luminex Technology

Measurements of cytokines was performed as described in example 3 except for using antibodies specific for IFNγ, IL-17 and IL-22 as depicted in Table 3.

TABLE 5

Material for protein quantification of the different proteins by ELISA or Luminex technology

| Cytokine | Antibodies | Manufacturer |
| --- | --- | --- |
| IFNγ | #MAB785, #554410 | R&D systems, BD Biosciences |
| IL-17A | #555068, #555067 | BD Biosciences |
| IL-22 | ELISA Set, #88-7422-88 | Invitrogen |

This experiment indicates that BPI alone or in combination with CpG ODNs indeed promotes not only activation but also differentiation of naïve T cells into Th1, Th17 and Th22 cells as well as activation of CD8+ T cells. Th1 differentiation is especially promoted by stimulation with BPI in combination with CpG ODNs.

Example 11

As shown in FIG. 15, antigen-presenting cells, preferably BPI high-responsive cells, e.g. DCs, are stimulated with BPI alone or in combination with BPI ligands or other suitable combination partners, e.g. bLPs, LTAs, CpG ODNs, R848, Poly(I:C) or ManLAM. After variable incubation time, e.g. for 1 hour to 4 weeks, supernatants (SN) are collected, pooled and stored at −20° C. T cells are isolated from peripheral blood or other organs of a donor. For T cell activation, T cells are stimulated with the supernatant (SN) in combination with other stimuli e.g. aCD3 antibodies, aCD28 antibodies, specific antigens, dendritic cells, other antigen-presenting cells or a combination thereof. After a variable incubation time, e.g. from 1 hour to 3 month, differentiated T cells are harvested for transfer to patients or storage. As examples for suitable methods see examples 1 to 7 (FIGS. 1 to 5 and 6 to 11, stimulation of antigen-presenting cells), example 9 (FIG. 12, stimulation of lymph node cells in the presence of dendritic cells) and example 10 (FIG. 13, stimulation of CD4+naïve T cells and CD8+ T cells with supernatant derived from dendritic cells stimulated with BPI or BPI in combination with BPI ligands).

The present inventors have surprisingly found that BPI can activate immune cells, such as dendritic cells, even without interaction partners, particularly without microbial ligands, resulting in a BPI-specific pattern of gene expression and protein secretion. Administration of BPI to target cells unexpectedly resulted in expression of T cell activating and Th1 cell, Th17 cell, and cytotoxic T cell promoting cytokine IL-2, and other immunostimulatory cytokines. IL-2 expression was extraordinary high as compared to TLR and CLR ligands. Furthermore, BPI preferentially stimulates antigen-presenting cells such as dendritic cells. Moreover, the present inventors disclose the immunostimulatory effect of BPI to be synergistically enhanced by TLR- and CLR-ligands, such as bacterial lipopeptides, lipoteichoic acid, nucleic acids and nucleic acid analoga. The molecules regulated by BPI, such as cytokines, chemokines, cell surface molecules, and receptors, have a high potential to regulate immune cells, and thus the immune response to endogenous and exogenous antigens. Conclusively, BPI has a high potential to be used in a method of immunization, or in combination with other suitable combination partners and/or an antigen. BPI preferentially stimulates antigen-presenting cells such as dendritic cells unexpectedly resulting in high secretion of IL-2 and CXCL10, which consecutively induce immune cells, such as Th1 cells and cytotoxic T cells. Therefore, BPI is a very promising candidate for an adjuvant used in a vaccination against HIV, hepatitis, influenza, malaria, *Mycobacterium tuberculosis*, allergies, or cancer.

The features of the present invention disclosed in the specification, the claims, and/or in the accompanying figures may, both separately and in any combination thereof, be material for realizing the invention in various forms thereof.

REFERENCES

[1] Zhu J, Yamane H, Paul W E (2010) Differentiation of effector CD4 T cell populations. *Annual review of immunology* 28:445-489.

[2] Hsieh C S, Macatonia S E, Tripp C S, Wolf S F, O'Garra A et al. (1993) Development of TH1 CD4+ T cells through IL-12 produced by Listeria-induced macrophages. *Science* (New York, N.Y.) 260 (5107): 547-549.

[3] Heufler C, Koch F, Stanzl U, Topar G, Wysocka M et al. (1996) Interleukin-12 is produced by dendritic cells and mediates T helper 1 development as well as interferon-gamma production by T helper 1 cells. *European journal of immunology* 26 (3): 659-668.

[4] Groom J R, Richmond J, Murooka T T, Sorensen E W, Sung J H, et al. (2012) CXCR3 chemokine receptor-ligand interactions in the lymph node optimize CD4+T helper 1 cell differentiation. *Immunity* 37 (6): 1091-1103.

[5] Srivastava A, Casey H, Johnson N, Levy O, Malley R (2007) Recombinant Bactericidal/Permeability-Increasing Protein rBPI21 Protects against Pneumococcal Disease. *Infect Immun*, p. 342-349.

[6] Levin M, Quint P A, Goldstein B, Barton P, Bradley J S, Shemie S D, Yeh T, Kim S S, Cafaro D P, Scannon P J, Giroir B P, and the rBPI21 Meningococcal Sepsis Study Group (2000) Recombinant bactericidal/permeability-increasing protein (rBPI21) as adjunctive treatment for children with severe meningococcal sepsis: a randomized trial. *The Lancet* (356): 961-967.

[7] Lutz M B, Kukutsch N, Ogilvie AL, Rossner S, Koch F, et al. (1999) An advanced culture method for generating large quantities of highly pure dendritic cells from mouse bone marrow. *Journal of Immunological Methods* 223:77.

[8] Heβ N, Waldow F, Kohler T P, Rohde M, Kreikemeyer B, et al. (2017) Lipoteichoic acid deficiency permits normal growth but impairs virulence of *Streptococcus pneumoniae*. *Nature communications* 8:2093.

The invention claimed is:

1. A method of immunization of a patient, said method comprising administering to the patient an effective amount of bactericidal/permeability-increasing Protein (BPI)-stimulated target cells,
wherein said method comprises administering BPI as a stimulant to target cells in vitro or ex vivo, wherein said stimulated target cells are subsequently administered to said patient in vivo, wherein the target cells are dendritic cells,
wherein BPI stimulates the dendritic cells to produce cytokines that promote lymphoid cell responses,
wherein said immunization prevents or treats a disease selected from chronic inflammatory diseases and graft-versus-host disease (GvHD), and/or wherein said immunization treats a cancerous disease.

2. The method according to claim 1, wherein BPI is coadministered with an immunomodulatory agent selected from the group consisting of BPI-ligands, check-point inhibitors, TLR ligands, CLR ligands, CD1 ligands, inflammasome activators, alarmines and other pathogen-associated or danger-associated molecular patterns, lipoarabinomannans, phosphatidyl inositol mannosides, lipomannans, phospholipids, compounds containing a diacyl-thioglycerol motif, immunostimulatory agents displaying an acyl-anchor, antibodies, cytokines, chemokines, nucleic acids, and nucleic acid analogs.

3. The method according to claim 2, wherein said immunomodulatory agent is an immunostimulatory agent, wherein said immunostimulatory agent is a bacterial lipopeptide (bLP) or-protein, a lipoteichoic acid or CpG ODN, or is a CLR ligand.

4. The method according to claim 2, wherein said immunomodulatory agent is an immunostimulatory agent selected from lipoarabinomannans, nucleic acids, nucleic acid analogs, and immunostimulatory agents displaying an acyl-anchor.

5. The method according to claim 1, wherein BPI is coadministered with an antigen.

6. The method according to claim 5, wherein said antigen is covalently coupled to BPI and/or to a BPI-ligand and/or to a carrier, or wherein said antigen is coadministered with said BPI, but not covalently coupled therewith, using a joint pharmaceutically acceptable delivery system for said antigen and said BPI, or wherein said antigen is coadministered with said BPI, but not covalently coupled therewith, using a separate pharmaceutically acceptable delivery system for each of said antigen and said BPI.

7. The method according to claim 5, wherein BPI is administered as a BPI-encoding nucleic acid within a vector, and wherein a nucleic acid sequence of said antigen is encoded by the same vector as said nucleic acid sequence of BPI, or wherein a nucleic acid sequence of said antigen and said nucleic acid sequence of said BPI are each encoded by a separate vector, or wherein BPI is administered as a peptide and said antigen is administered being encoded by a vector, or wherein BPI is administered being encoded by a vector and said antigen is administered as a peptide.

8. The method according to claim 1, wherein said in vitro or ex vivo stimulated target cells trigger generation of specific T cells, or generation of innate lymphoid cells, NK cells.

9. The method according to claim 8, wherein the method triggers the generation of T cells selected from Th1 cells, Th17 cells, Th22 cells, Tfh cells, regulatory T cells, γδ T cells, and cytotoxic T cells.

10. The method according to claim 1, wherein the lymphoid cell responses are Th1, Th17, Th22, regulatory T cell and/or cytotoxic T cell immune responses.

11. The method according to claim 1, wherein said immunization treats chronic inflammatory diseases.

12. The method according to claim 1, wherein said immunization treats GvHD.

* * * * *

SEQUENCE LISTING

```
<160> NUMBER OF SEQ ID NOS: 2

<210> SEQ ID NO 1
<211> LENGTH: 457
<212> TYPE: PRT
<213> ORGANISM: Homo sapiens

<400> SEQUENCE: 1

Ala Val Asn Pro Gly Val Val Arg Ile Ser Gln Lys Gly Leu Asp
1               5                   10                  15

Tyr Ala Ser Gln Gln Gly Thr Ala Ala Leu Gln Lys Glu Leu Lys Arg
            20                  25                  30

Ile Lys Ile Pro Asp Tyr Ser Asp Ser Phe Lys Ile Lys His Leu Gly
        35                  40                  45

Lys Gly His Tyr Ser Phe Tyr Ser Met Asp Ile Arg Glu Phe Gln Leu
    50                  55                  60

Pro Ser Ser Gln Ile Ser Met Val Pro Asn Val Gly Leu Lys Phe Ser
65                  70                  75                  80

Ile Ser Asn Ala Asn Ile Lys Ile Ser Gly Lys Trp Lys Ala Gln Lys
                85                  90                  95

Arg Phe Leu Lys Met Ser Gly Asn Phe Asp Leu Ser Ile Glu Gly Met
                100                 105                 110

Ser Ile Ser Ala Asp Leu Lys Leu Gly Ser Asn Pro Thr Ser Gly Lys
            115                 120                 125

Pro Thr Ile Thr Cys Ser Ser Cys Ser Ser His Ile Asn Ser Val His
        130                 135                 140
```

```
Val His Ile Ser Lys Ser Lys Val Gly Trp Leu Ile Gln Leu Phe His
145                 150                 155                 160

Lys Lys Ile Glu Ser Ala Leu Arg Asn Lys Met Asn Ser Gln Val Cys
            165                 170                 175

Glu Lys Val Thr Asn Ser Val Ser Ser Glu Leu Gln Pro Tyr Phe Gln
            180                 185                 190

Thr Leu Pro Val Met Thr Lys Ile Asp Ser Val Ala Gly Ile Asn Tyr
            195                 200                 205

Gly Leu Val Ala Pro Ala Thr Thr Ala Glu Thr Leu Asp Val Gln
    210                 215                 220

Met Lys Gly Glu Phe Tyr Ser Glu Asn His His Asn Pro Pro Phe
225                 230                 235                 240

Ala Pro Pro Val Met Glu Phe Pro Ala Ala His Asp Arg Met Val Tyr
                245                 250                 255

Leu Gly Leu Ser Asp Tyr Phe Phe Asn Thr Ala Gly Leu Val Tyr Gln
                260                 265                 270

Glu Ala Gly Val Leu Lys Met Thr Leu Arg Asp Asp Met Ile Pro Lys
            275                 280                 285

Glu Ser Lys Phe Arg Leu Thr Thr Lys Phe Phe Gly Thr Phe Leu Pro
290                 295                 300

Glu Val Ala Lys Lys Phe Pro Asn Met Lys Ile Gln Ile His Val Ser
305                 310                 315                 320

Ala Ser Thr Pro Pro His Leu Ser Val Gln Pro Thr Gly Leu Thr Phe
                325                 330                 335

Tyr Pro Ala Val Asp Val Gln Ala Phe Ala Val Leu Pro Asn Ser Ser
                340                 345                 350

Leu Ala Ser Leu Phe Leu Ile Gly Met His Thr Thr Gly Ser Met Glu
            355                 360                 365

Val Ser Ala Glu Ser Asn Arg Leu Val Gly Glu Leu Lys Leu Asp Arg
            370                 375                 380

Leu Leu Leu Glu Leu Lys His Ser Asn Ile Gly Pro Phe Pro Val Glu
385                 390                 395                 400

Leu Leu Gln Asp Ile Met Asn Tyr Ile Val Pro Ile Leu Val Leu Pro
                405                 410                 415

Arg Val Asn Glu Lys Leu Gln Lys Gly Phe Pro Leu Pro Thr Pro Ala
            420                 425                 430

Arg Val Gln Leu Tyr Asn Val Val Leu Gln Pro His Gln Asn Phe Leu
            435                 440                 445

Leu Phe Gly Ala Asp Val Val Tyr Lys
    450                 455

<210> SEQ ID NO 2
<211> LENGTH: 483
<212> TYPE: PRT
<213> ORGANISM: Mus musculus

<400> SEQUENCE: 2

Met Thr Trp Ala Pro Asp Asn Val Arg Lys Trp Ser Ala Leu Leu Leu
1               5                   10                  15

Leu Ala Ile Ile Gly Thr Ala Leu Thr Ala Ala Thr Asp Pro Gly Phe
            20                  25                  30

Val Ala Met Ile Ser Gln Lys Gly Leu Asp Phe Ala Cys Gln Gln Gly
        35                  40                  45

Val Val Glu Leu Gln Lys Glu Leu Gln Ala Ile Ser Val Pro Asp Phe
    50                  55                  60
```

```
Ser Gly Val Phe Lys Ile Lys His Leu Gly Lys Gly Ser Tyr Glu Phe
 65                  70                  75                  80

Tyr Ser Met Ala Val Asp Gly Phe His Ile Pro Asn Pro Lys Ile Glu
                 85                  90                  95

Met Leu Pro Ser Asp Gly Leu Arg Val Phe Ile Lys Asp Ala Ser Ile
            100                 105                 110

Lys Ile Asn Gly Lys Trp Met Ser Arg Lys Asn Phe Leu Lys Ala Gly
        115                 120                 125

Gly Asn Phe Glu Leu Ser Ile Gln Gly Val Ser Ile Ser Thr Asp Leu
130                 135                 140

Ile Leu Gly Ser Asp Ser Ser Gly His Ile Thr Thr Ile Cys Ser Asn
145                 150                 155                 160

Cys Asp Ser His Ile Asp Ser Val His Ile Lys Ile Ser Gly Ser Met
                165                 170                 175

Leu Gly Trp Leu Ile Arg Leu Phe His Arg Lys Ile Glu Thr Ser Leu
            180                 185                 190

Lys Asn Ile Ile Tyr Lys Lys Ile Cys Lys Ile Val Arg Asp Ser Val
        195                 200                 205

Ser Ser Lys Leu Gln Pro Tyr Leu Lys Thr Leu Ser Val Ile Thr Arg
210                 215                 220

Val Asp Asp Val Thr Ser Val Asp Tyr Ser Leu Ala Pro Leu Thr
225                 230                 235                 240

Thr Thr Asn Gln Phe Leu Glu Gly Gln Leu Lys Gly Glu Phe Phe Trp
                245                 250                 255

Arg Gly His Arg Asp Pro Leu Pro Ile His Pro Val Met Arg Phe
            260                 265                 270

Val Pro Asn Gly Ala Tyr Met Val Cys Met Gly Ile Ser Asp Tyr Phe
        275                 280                 285

Phe Asn Thr Glu Val Leu Ala Tyr Gln Gln Ser Gly Thr Leu Lys Met
290                 295                 300

Thr Leu Gly Gly Gln Leu Leu Ser Asn Asn Gly Arg Phe Gln Leu Asn
305                 310                 315                 320

Thr Asp Phe Leu Arg Thr Phe Leu Pro Lys Val Ala Lys Met Phe Pro
                325                 330                 335

Ser Met Gly Val Gln Leu Leu Ile Ser Ala Pro Val Pro Val His Leu
            340                 345                 350

Ser Ile Gln Pro Ser Gly Leu Ser Phe Asn Pro Lys Leu Glu Thr Gln
        355                 360                 365

Ala Phe Val Val Leu Pro Asn Ala Ser Leu Val Pro Leu Phe Val Leu
370                 375                 380

Gly Met Lys Thr Asn Ala Ser Leu Glu Val Asp Ala Glu Glu Asn Arg
385                 390                 395                 400

Leu Val Gly Glu Met Lys Leu Gly Ser Arg Trp Leu Leu Glu Leu Lys
                405                 410                 415

Glu Ser Lys Phe Gly Pro Phe Lys Val Glu Tyr Leu Glu Asp Val Ile
            420                 425                 430

Asn Tyr Leu Val Ser Thr Leu Val Leu Pro Lys Ile Asn Glu Arg Leu
        435                 440                 445
```

```
Arg Arg Gly Phe Pro Leu Pro Leu Pro Ala Gly Ile Arg Phe Ser His
    450                 455                 460

Phe Thr Phe Tyr Pro Tyr Gln Asn Phe Leu Leu Glu Ala Asp Leu
465                 470                 475                 480

His Leu Ile
```